US012613210B2

(12) United States Patent
Wang et al.

(10) Patent No.: US 12,613,210 B2
(45) Date of Patent: Apr. 28, 2026

(54) SENSOR SYSTEM AND GAS SYSTEM

(71) Applicant: KABUSHIKI KAISHA TOSHIBA, Tokyo (JP)

(72) Inventors: Ping Wang, Fujisawa (JP); Hiroaki Yamazaki, Yokohama (JP); Fumitaka Ishibashi, Tokyo (JP); Ryota Kitagawa, Tokyo (JP); Yuki Kudo, Yokohama (JP); Naoya Fujiwara, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 486 days.

(21) Appl. No.: 18/172,915

(22) Filed: Feb. 22, 2023

(65) Prior Publication Data

US 2024/0027384 A1 Jan. 25, 2024

(30) Foreign Application Priority Data

Jul. 21, 2022 (JP) ................................. 2022-116426

(51) Int. Cl.
*G01N 27/18* (2006.01)

(52) U.S. Cl.
CPC .................................... *G01N 27/18* (2013.01)

(58) Field of Classification Search
None
See application file for complete search history.

(56) References Cited

U.S. PATENT DOCUMENTS

| | | | |
|---|---|---|---|
| 10,935,509 B2 * | 3/2021 | Liu | ........................ G01N 27/04 |
| 2013/0259084 A1 | 10/2013 | Ooishi | |
| 2018/0292338 A1 * | 10/2018 | Liu | ........................ G01N 27/04 |
| 2020/0080954 A1 * | 3/2020 | Yamazaki | ........... G01N 27/123 |
| 2021/0079542 A1 | 3/2021 | Kitagawa et al. | |

FOREIGN PATENT DOCUMENTS

| | | |
|---|---|---|
| JP | 2013-205105 A | 10/2013 |
| JP | 2021-46574 A | 3/2021 |

* cited by examiner

*Primary Examiner* — Daniel S Larkin
(74) *Attorney, Agent, or Firm* — Finnegan, Henderson, Farabow, Garrett & Dunner, LLP

(57) ABSTRACT

According to one embodiment, a sensor system includes a pipe and a sensor. The sensor is configured to detect a detection target substance in the pipe. The sensor includes a base, a first detection part, and a second detection part. The base includes a first base region and a second base region. The first detection part includes a first support part, a first connection part, and a first detection element. The second detection art includes a second support part, a second connection part, and a second detection element.

20 Claims, 30 Drawing Sheets

SENSOR SYSTEM AND GAS SYSTEM

CROSS-REFERENCE TO RELATED APPLICATIONS

This application is based upon and claims the benefit of priority from Japanese Patent Application No. 2022-116426, filed on Jul. 21, 2022; the entire contents of which are incorporated herein by reference.

FIELD

Embodiments described herein relate generally to a sensor system and a gas system.

BACKGROUND

For example, there are sensors using MEMS (Micro Electro Mechanical Systems) elements. The sensor is applied for a gas system such as a gas conversion system. It is desired to improve the characteristics of the sensor.

DETAILED DESCRIPTION

Figure 1:
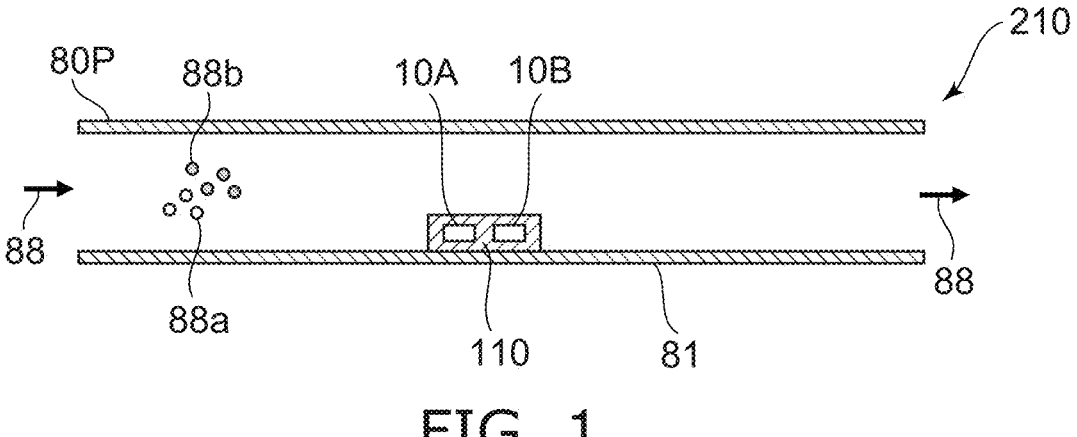
FIG. 1 is a schematic view illustrating a sensor system according to a first embodiment.

According to one embodiment, a sensor system includes a pipe, and at least one sensor configured to detect a detection target substance in the pipe. The at least one sensor includes a base, a first detection part, and a second detection part. The base includes a first base region and a second base region. The first detection part includes a first support part, a first connection part, and a first detection element. A position of the first detection part with respect to the first base region is fixed. The first connection part is supported by the first support part. The first connection part supports the first detection element. A first gap is provided between the first base region and the first detection element. The first detection part has a first area of the first detection element, a first connection part length of the first connection part, a first connection part width of the first connection part, a first connection part thickness of the first connection part, a first connection part material of the first connection part, and a first distance. The first distance is a distance between the first base region and the first detection element. The second detection part includes a second support part, a second connection part, and a second detection element. A position of the second support part with respect to the second base region is fixed. The second connection part is supported by the second support part. The second connection part supports the second detection element. A second gap is provided between the second base region and the second detection element. The second detection part has at least one of a second area different from the first area of the second detection element, a second connection part length different from the first connection part length of the second connection part, a second connection part width different from the first connection part width of the second connection part, a second connection part thickness different from the first connection part thickness of the first connection part thickness, a second connection part material different from the first connection part material of the second connection part, or a second distance different from the first distance. The second distance is a distance between the second base region and the second detection element.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic view illustrating a sensor system according to a first embodiment.

As shown in FIG. 1, a sensor system 210 according to an embodiment includes a pipe 80P and at least one sensor 110.

The at least one sensor 110 can detect the detection target substance 88 in the pipe 80P. For example, the detection target substance 88 is a gas. The sensor 110 detects the detection target substance 88 flowing through the pipe 80P. The arrows in the drawings represent the detection target substance 88 and its flow direction through the pipe 80P.

In the embodiment, the sensor 110 includes multiple detection parts (e.g., first detection part 10A and second detection part 10B, etc.). By processing detection signals obtained from the multiple detection parts, the detection target substance 88 can be detected with higher accuracy.

For example, the detection target substance 88 includes a first substance 88a and a second substance 88b. The second substance 88b is different than the first substance 88a.

At least two of the multiple detection parts have different detection characteristics. Detection signals (detection results) from detection parts having different detection characteristics are processed. For example, concentrations of different types of multiple substances can be detected with high accuracy. A sensor system capable of improving characteristics can be provided.

Hereinafter, examples of sensors (such as the sensor 110) according to the embodiment will be described.

Figure 2:
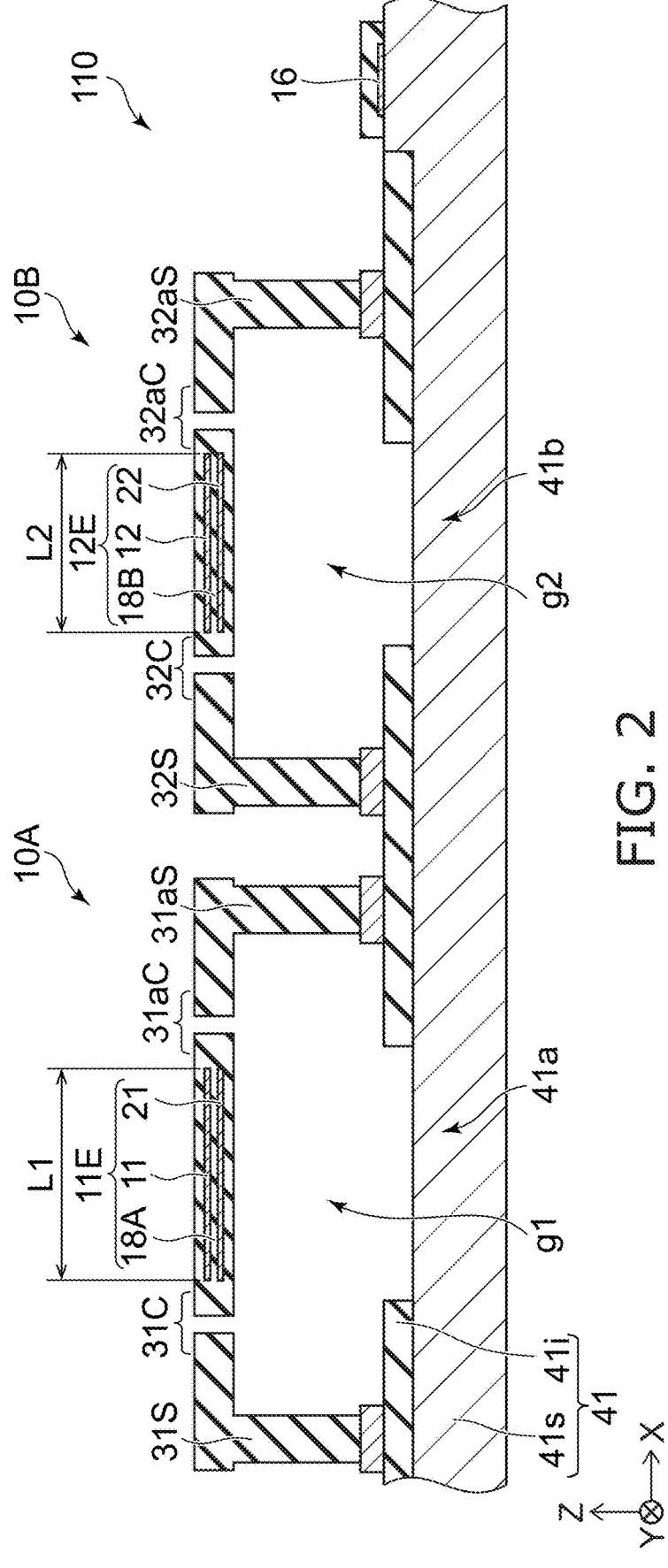
FIG. 2 is a schematic view illustrating a part of the sensor system according to the first embodiment.
Figure 3:
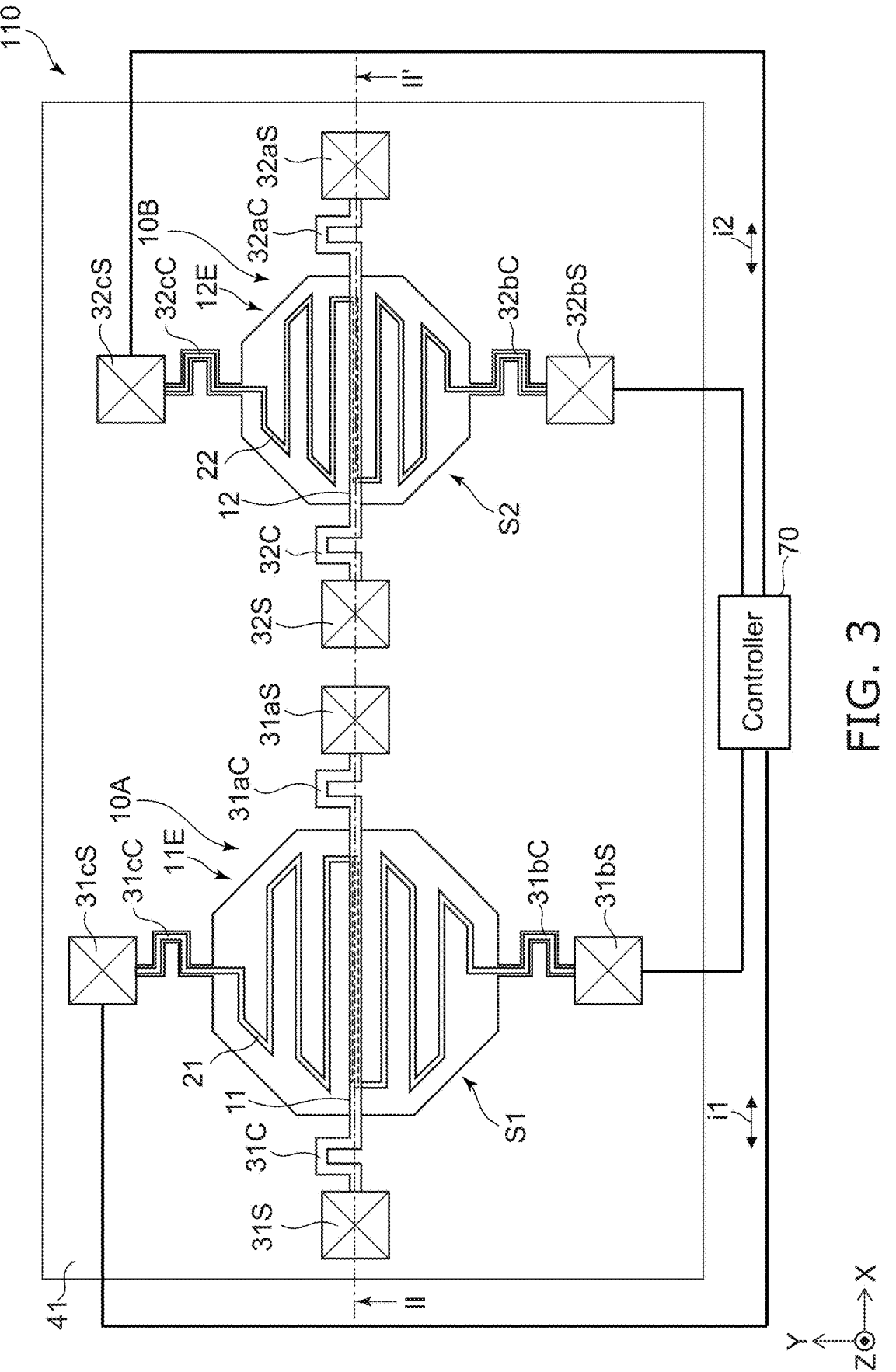
FIG. 3 is a schematic view illustrating a part of the sensor system according to the first embodiment.
Figure 4:
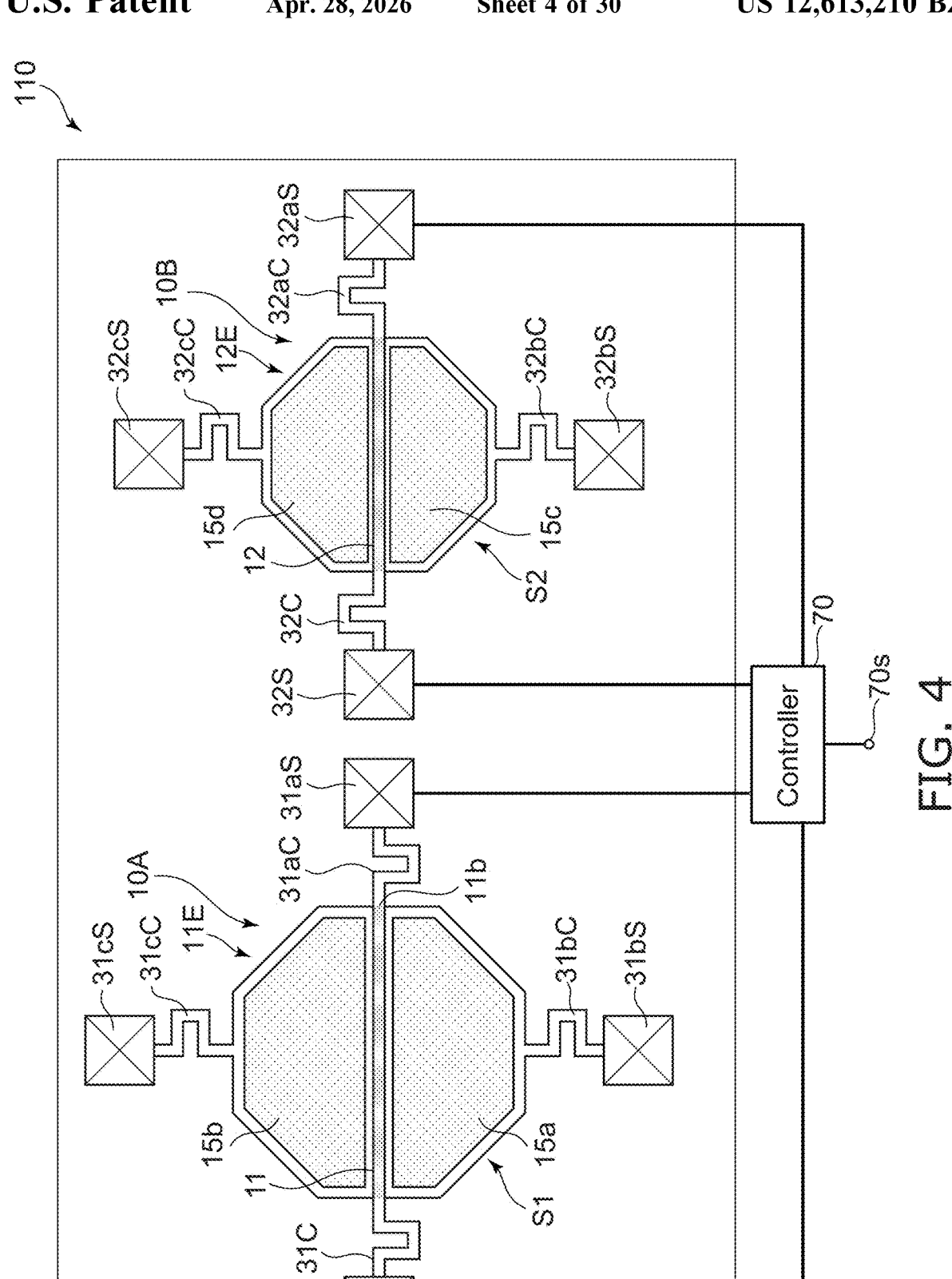
FIG. 4 is a schematic view illustrating a part of the sensor system according to the first embodiment.

FIGS. 2 to 4 are schematic views illustrating a part of the sensor system according to the first embodiment.

FIG. 2 is a cross-sectional view taken along the line II-II' of FIG. 3. FIGS. 3 and 4 are plan views. As shown in FIGS. 2 to 4, the sensor 110 according to the embodiment includes a base 41, the first detection part 10A and the second detection part 10B.

As shown in FIG. 2, the base 41 includes a first base region 41a and a second base region 41b. In this example, the base 41 includes a substrate 41s and an insulating film 41i. The substrate 41s may be, for example, a semiconductor substrate (for example, a silicon substrate). The substrate 41s may include, for example, a semiconductor circuit or the like. The substrate 41s may include connection members such as via electrodes.

In this example, the second base region 41b is continuous with the first base region 41a. For example, multiple detection parts are provided on one semiconductor substrate. As will be described later, the second base region 41b may be separated from the first base region 41a.

A direction from the first base region 41a to the second base region 41b is along an upper surface of the base 41, for example.

As shown in FIG. 2, the first detection part 10A includes a first detection element 11E. The first detection element 11E includes a first resistance member 11, a first conductive member 21 and a first insulating member 18A. At least a part of the first insulating member 18A is between the first resistance member 11 and the first conductive member 21. In this example, the first insulating member 18A surrounds a first resistance member 11. The first insulating member 18A surrounds the first conductive member 21. In this example, the first conductive member 21 is between the base 41 and the first resistance member 11. In the embodiment, the first resistance member 11 may be between the base 41 and the first conductive member 21. A first gap g1 is provided between the first base region 41a and the first detection element 11E.

FIG. 3 illustrates a planar pattern of the first conductive member 21 and the second conductive member 22. FIG. 4 illustrates a planar pattern of the first resistance member 11 and the second resistance member 12.

As shown in FIGS. 3 and 4, in this example, the first detection element 11E (the portion including the first resistance member 11, the first conductive member 21 and the first insulating member 18A) is octagonal. The planar shape of the first detection element 11E is arbitrary. The first detection element 11E has a first area S1. The first area S1 is an area of the first detection element 11E on a plane crossing a first direction from the first base region 41a to the first detection element 11E.

As shown in FIG. 2, the first direction is defined as a Z-axis direction. A direction perpendicular to the Z-axis direction is defined as an X-axis direction. A direction perpendicular to the Z-axis direction and the X-axis direction is defined as a Y-axis direction. A plane crossing the first direction is, for example, an X-Y plane.

As shown in FIG. 2, the second detection part 10B includes a second detection element 12E. The second detection element 12E includes a second resistance member 12, a second conductive member 22 and a second insulating member 18B. At least a part of the second insulating member 18B is between the second resistance member 12 and the second conductive member 22. In this example, the second insulating member 18B surrounds the second resistance member 12. The second insulating member 18B surrounds the second conductive member 22. In this example, the second conductive member 22 is between the base 41 and the second resistance member 12. In the embodiment, the second resistance member 12 may be between the base 41 and the second conductive member 22. A second gap g2 is provided between the second base region 41b and the second detection element 12E.

As shown in FIGS. 3 and 4, in this example, the second detection element 12E (the portion including the second resistance member 12, the second conductive member 22 and the second insulating member 18B) is octagonal. The planar shape of the second detection element 12E is arbitrary. The second detection element 12E has a second area S2. The second area S2 is an area of the second detection element 12E on the plane (the plane crossing the first direction). The second area S2 is smaller than the first area S1.

As shown in FIGS. 3 and 4, a controller 70 may be provided. The controller 70 can be electrically connected to the first resistance member 11, the first conductive member 21, the second resistance member 12 and the second conductive member 22. For example, the controller 70 supplies a first current i1 to the first conductive member 21 to raise a temperature of the first detection element 11E. The controller 70 supplies a second current i2 to the second conductive member 22 to raise a temperature of the second detection element 12E.

The temperature of these detection elements rises due to Joule heat due to the supplied current. The heat amount in these detection elements changes via substances (such as gases) included in the space around these detection elements. The degree of heat amount change depends on the thermal conductivity of the substances included in the surrounding space. Temperatures of these detection elements are detected by resistance members. By detecting the temperature of these detection elements, the presence and concentration of substances included in the surrounding space can be detected. A detection signal 70s including the detection result is output from the controller 70.

In the embodiment, for example, areas are different between the first detection element 11E and the second detection element 12E. Due to the difference in area, these detection elements have different heat amount change characteristics (for example, heat dissipation characteristics). Due to the difference in area, the temperature change characteristics of these detection elements are different from each other. By using the difference in characteristics of temperature change, for example, it is possible to detect the substance to be detected with higher accuracy. According to the embodiment, it is possible to provide a sensor whose characteristics can be improved.

For example, the space around these detection elements may include multiple substances of different types. For example, the space may include carbon monoxide, carbon dioxide (e.g., first substance), and hydrogen (e.g., second substance). In the first reference example using one detection element, the temperature of the detection element is affected by both the thermal conductivity of multiple substances of different types and the concentration of these substances. Therefore, in the first reference example, it is difficult to detect multiple different types of substances (first substance, second substance, etc.).

In a second reference example, a method is conceivable in which one detection element is used, the detection element is heated to multiple temperatures, and the temperature (degree of heat dissipation) of the detection element is detected at multiple temperatures. In the second reference example, detection accuracy is not sufficient when detecting multiple types of substances using multiple temperature measurement results of the detection element. In the second reference example, since only one detection element is used and only one type of heat dissipation characteristic is used, the accuracy is insufficient. Furthermore, in the second reference example, since the temperature needs to be raised multiple times, the measurement time is long. In the second reference example, the control circuit is complicated.

In the embodiment, the multiple detection elements with different heat dissipation characteristics are used. By using the temperature change characteristics of the detection elements with different heat dissipation characteristics, it is possible to separate the influence of the thermal conductivity of multiple substances of different types and the concentrations of these substances. For example, for each of the multiple detection elements, information about the relationship between the concentration of each of multiple substances of different types and the temperature (or the value corresponding to the temperature) is acquired in advance. By using this information and the measured values (multiple values) of the temperature (or the value corresponding to the temperature) obtained from these detection elements, the concentration of each of multiple substances of different types can be detected with high accuracy. For example, by solving simultaneous equations, it is possible to detect concentrations of different substances with high accuracy. In the embodiment, the measurement time is short because the measurement is performed with multiple detection elements.

An example of a method of processing in detection will be described later in the embodiment.

As described above, in the embodiment, the second area S2 of the second detection element 12E is smaller than the first area S1 of the first detection element 11E. In the embodiment, the relationship between these areas may be reversed.

As shown in FIG. 2, the first detection element 11E has a first length L1 in a direction (e.g., second direction) crossing the first direction (Z-axis direction). The second direction is one direction along the X-Y plane. The second direction may be, for example, the X-axis direction. The second detection element 12E has a second length L2 in a direction (e.g., second direction) crossing the first direction (Z-axis direction). In this example, the second length L2 is shorter than the first length L1. A difference in area is obtained.

As shown in FIGS. 2 to 4, for example, the first detection part 10A may further include a first support part 31S and a first connection part 31C. The first support part 31S is fixed to the base 41. The first connection part 31C is supported by the first support part 31S and supports the first detection element 11E. A gap is provided between the first base region 41a and the first connection part 31C. The first connection part 31C has, for example, a spring structure. The first detection part 10A may have a cantilever structure.

The second detection part 10B may further include a second support part 32S and a second connection part 32C. The second support part 32S is fixed to the base 41. The second connection part 32C is supported by the second support part 32S and supports the second detection element 12E. A gap is provided between the second base region 41b and the second connection part 32C. The second connection part 32C has, for example, a spring structure. The second detection part 10B may have a cantilever structure.

As shown in FIGS. 2 to 4, for example, the first detection part 10A may further include a first other support part 31aS and a first other connection part 31aC. The first other support part 31aS is fixed to the base 41. The first other connection part 31aC is supported by the first other support part 31aS and supports the first detection element 11E. A gap is provided between the first base region 41a and the first other connection part 31aC. In this example, the first detection element 11E is provided between the first connection part 31C and the first other connection part 31aC. The first detection part 10A may have a double-supported beam structure.

The second detection part 10B may further include a second other support part 32aS and a second other connection part 32aC. The second other support part 32aS is fixed to the base 41. The second other connection part 32aC is supported by the second other support part 32aS and supports the second detection element 12E. A gap is provided between the second base region 41b and the second other connection part 32aC. In this example, the second detection element 12E is provided between the second connection part 32C and the second other connection part 32aC. The second detection part 10B may have a double-supported beam structure.

As shown in FIGS. 3 and 4, the first detection part 10A may further include a support part 31bS and a connection part 31bC. The support part 31bS is fixed to the base 41. The connection part 31bC is supported by the support part 31bS and supports the first detection element 11E. A gap (not shown) is provided between the first base region 41*a* and the connection part 31*b*C. The connection part 31*b*C has, for example, a spring structure.

The first detection part 10A may further include a support part 31*c*S and a connection part 31*c*C. The support part 31*c*S is fixed to the base 41. The connection part 31*c*C is supported by the support part 31*c*S and supports the first detection element 11E. A gap (not shown) is provided between the first base region 41*a* and the connection part 31*c*C. The connection part 31*c*C has, for example, a spring structure.

In this example, a direction from the connection part 31*b*C to the connection part 31*c*C crosses a direction from the first connection part 31C to the first other connection part 31*a*C. In this example, the first conductive member 21 is electrically connected to a wiring provided on the base 41 via the connection part 31*b*C, the connection part 31*c*C, the support part 31*b*S, and the support part 31*c*S. The wiring is electrically connected to the controller 70. The first conductive member 21 has a meandering structure.

As shown in FIGS. 2 and 4, the second detection part 10B may further include a support part 32*b*S and a connection part 32*b*C. The support part 32*b*S is fixed to the base 41. The connection part 32*b*C is supported by the support part 32*b*S and supports the second detection element 12E. A gap (not shown) is provided between the second base region 41*b* and the connection part 32*b*C. The connection part 32*b*C has, for example, a spring structure.

The second detection part 10B may further include a support part 32*c*S and a connection part 32*c*C. The support part 32*c*S is fixed to the base 41. The connection part 32*c*C is supported by the support part 32*c*S and supports the second detection element 12E. A gap (not shown) is provided between the second base region 41*b* and the connection part 32*c*C. The connection part 32*c*C has, for example, a spring structure.

In this example, a direction from the connection part 32*b*C to the connection part 32*c*C crosses a direction from the second connection part 32C to the second other connection part 32*a*C. In this example, the second conductive member 22 is electrically connected to a wiring provided on the base 41 via the connection part 32*b*C, the connection part 32*c*C, the support part 32*b*S, and the support part 32*c*S. The wiring is electrically connected to the controller 70. The second conductive member 22 has a meandering structure. In one example, the shape of the second conductive member 22 may be similar to the shape of the first conductive member 21.

For example, the first connection part 31C, the first other connection part 31*a*C, the connection part 31*b*C, and the connection part 31*c*C may have a meandering structure. For example, the second connection part 32C, the second other connection part 32*a*C, the connection part 32*b*C, and the connection part 32*c*C may have a meandering structure.

As shown in FIG. 4, the first detection element 11E may include a first layer 15*a* and a second layer 15*b*. The first layer 15*a* and the second layer 15*b* have the same material and thickness as the first resistance member 11. The first resistance member 11 is provided between the first layer 15*a* and the second layer 15*b*. Warpage (deformation) of the first detection element 11E is suppressed by providing these layers.

As shown in FIG. 4, the second detection element 12E may include a third layer 15*c* and a fourth layer 15*d*. The third layer 15*c* and the fourth layer 15*d* have the same material and thickness as those of the second resistance member 12. The second resistance member 12 is provided between the third layer 15*c* and the fourth layer 15*d*. Warpage (deformation) of the second detection element 12E is suppressed by providing these layers.

As shown in FIG. 2, the sensor 110 may further include a resistance element 16. For example, the resistance element 16 is fixed to the base 41. As will be described later, the controller 70 may derive the difference between the electrical signal obtained from the first resistance member 11 and the electrical signal obtained from the resistance element 16. The controller 70 may derive the difference between the electrical signal obtained from the second resistance member 12 and the electrical signal obtained from the resistance element 16. As a result, for example, the influence of ambient temperature fluctuations or temperature fluctuations of the base 41 can be suppressed. Detection with higher accuracy becomes possible. In FIGS. 3 and 4, the resistance element 16 is omitted. Multiple resistance elements 16 may be provided. For example, the difference between the electrical signal obtained from the first resistance member 11 and the electrical signal obtained from one of the multiple resistance elements 16 may be derived. For example, the difference between the electrical signal obtained from the second resistance member 12 and the electrical signal obtained from another one of the multiple resistance elements 16 may be derived.

Another example of a sensor that can be applied to the sensor system according to the embodiment will be described later.

Figure 5A:
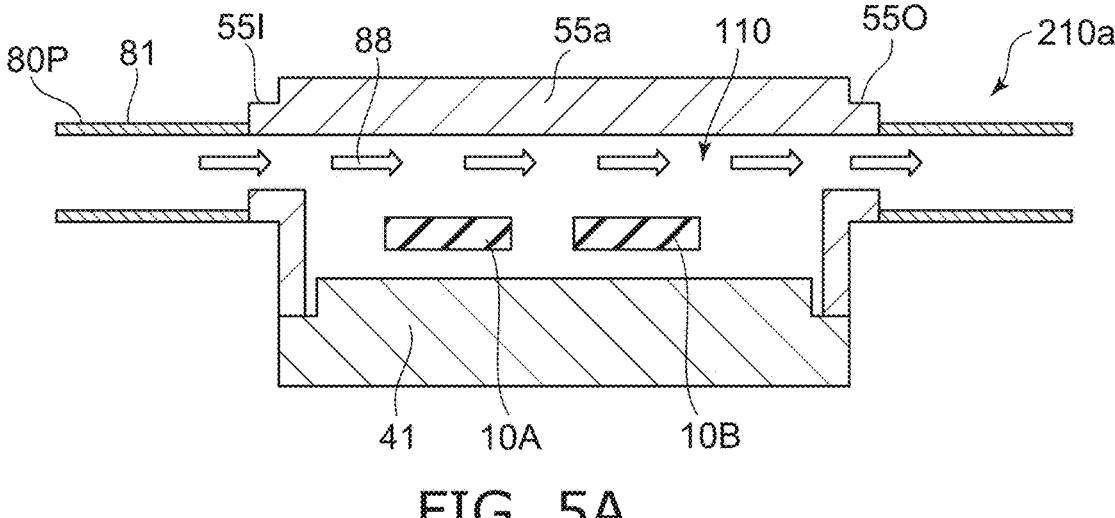
FIGS. 5A and 5B are schematic views illustrating alternative sensor systems according to the first embodiment.
Figure 5B:
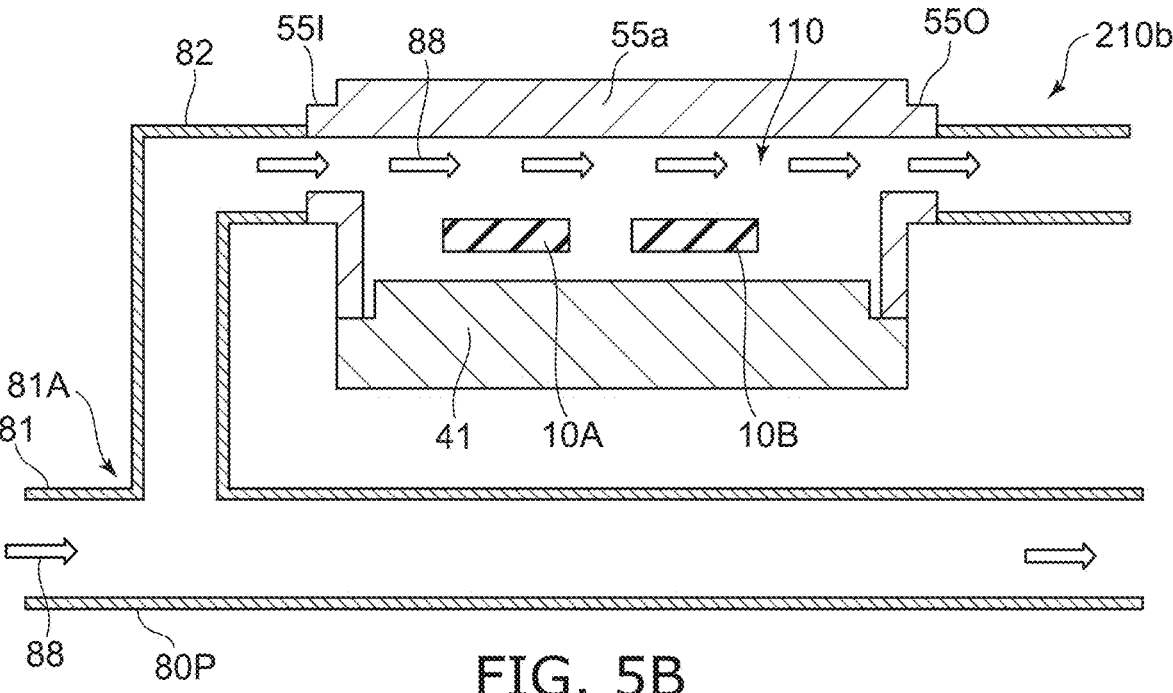

FIGS. 5A and 5B are schematic views illustrating alternative sensor systems according to the first embodiment.

As shown in FIG. 5A, in a sensor system 210*a* according to the embodiment, the sensor 110 includes a housing (e.g., first housing 55*a*). At least a part of the first detection part 10A and at least a part of the second detection part 10B are provided between the base 41 and the first housing 55*a*.

The first housing 55*a* includes a first inflow port 551 and a first outflow port 550. The detection target substance 88 can flow in from the first inflow port 551 between a part of the first housing 55*a* and the first detection part 10A and between a part of the first housing 55*a* and the second detection part 10B. The detection target substance 88 can exit through the first outflow port 550. A flow path for the detection target substance 88 is appropriately set. More stable detection becomes possible.

As shown in FIG. 5B, in a sensor system 210*b* according to the embodiment, the pipe 80P includes a first flow path 81 and a second flow path 82. The second flow path 82 branches off from the first flow path 81. In this example, the first flow path 81 has a first portion 81A. The second flow path 82 branches off from the first portion 81A. A part of the detection target substance 88 passes through the second flow path 82. The sensor 110 is provided, for example, in the second flow path 82. For example, the influence of the sensor 110 on the detection target substance 88 flowing through the main first flow path 81 is suppressed. More stable detection becomes possible.

Figure 6A:
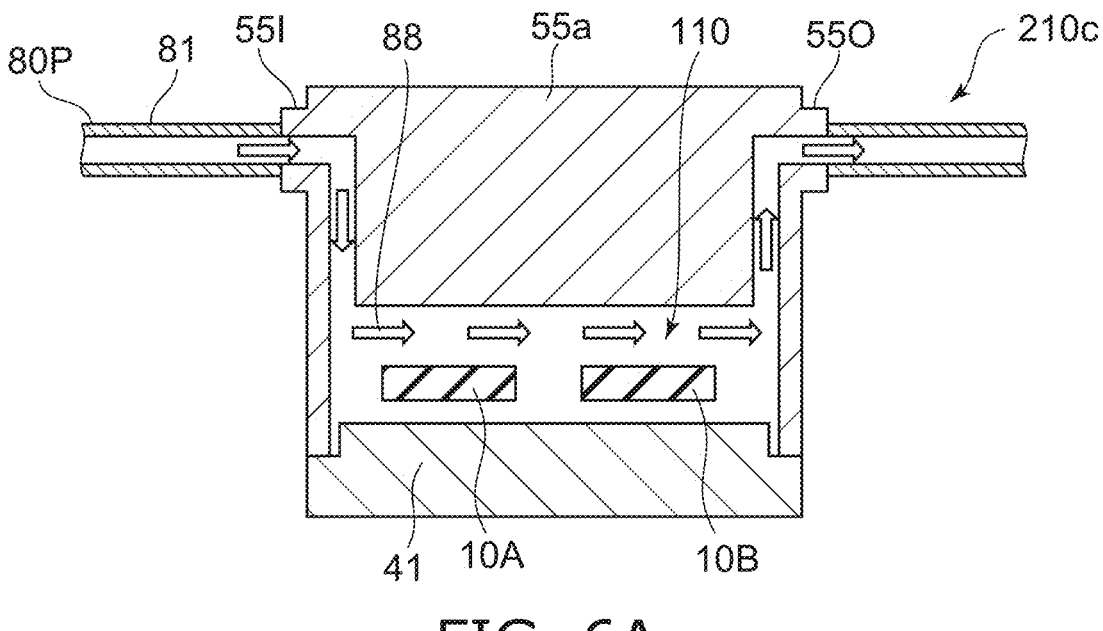
FIGS. 6A and 6B are schematic views illustrating alternative sensor systems according to the first embodiment.
Figure 6B:
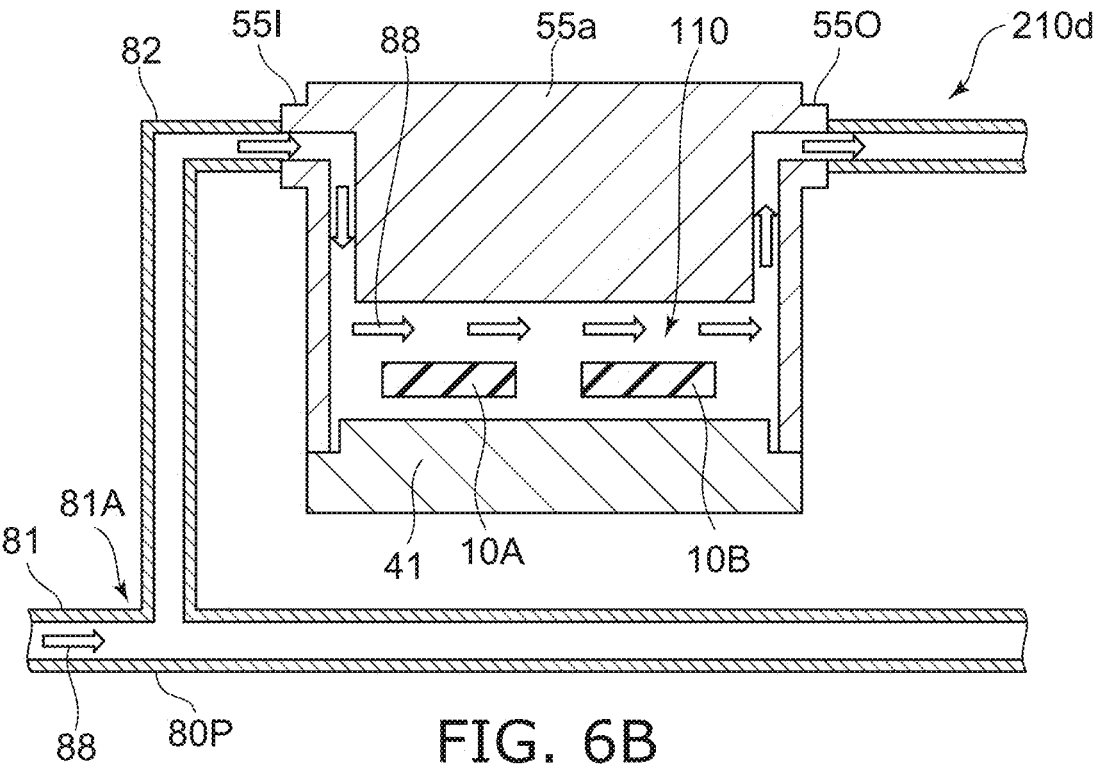

FIGS. 6A and 6B are schematic views illustrating alternative sensor systems according to the first embodiment.

As shown in FIG. 6A, in a sensor system 210*c* according to the embodiment, a direction from the first inflow port 551 to the detection part (the first detection part 10A and the second detection part 10B) crosses a direction of the gas flowing in the space between the detection part and the first housing 55*a*. A direction from the detection part (first detection part 10A and second detection part 10B) to the first outflow port 550 crosses a direction of gas flowing in the space between the detection part and the first housing 55*a*.

A flow path for the detection target substance 88 is appropriately set. More stable detection becomes possible.

As shown in FIG. 6B, in a sensor system 210*d* according to the embodiment, the second flow path 82 branches off from the first flow path 81. The sensor 110 is provided, for example, in the second flow path 82. More stable detection becomes possible.

FIGS. 7A to 7D are schematic views illustrating alternative sensor systems according to the first embodiment.

Figure 7A:
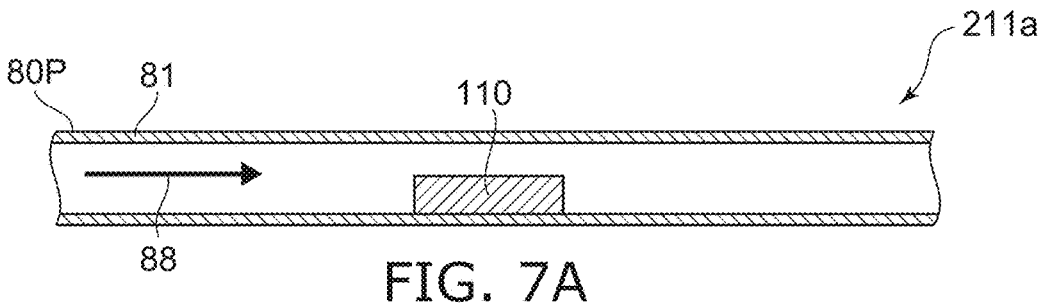
FIGS. 7A to 7D are schematic views illustrating alternative sensor systems according to the first embodiment.

As shown in FIG. 7A, in a sensor system 211*a* according to the embodiment, the sensor 110 is provided inside the pipe 80P (for example, inside the first flow path 81).

Figure 7B:
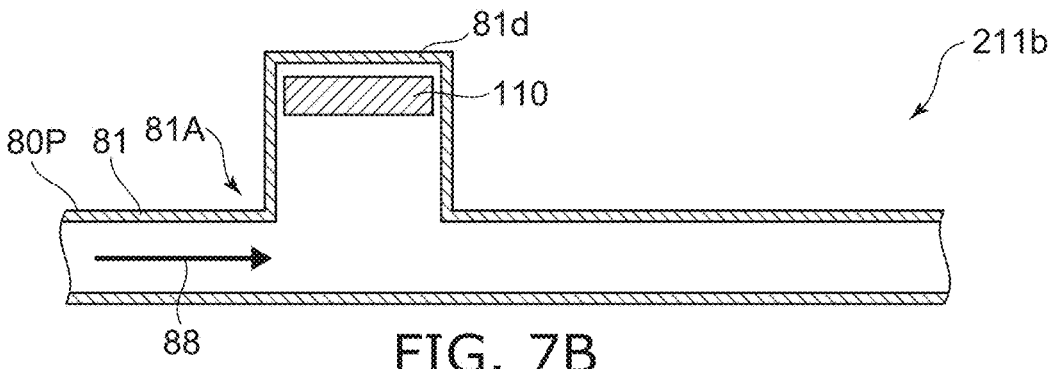

As shown in FIG. 7B, in a sensor system 211*b* according to the embodiment, the pipe 80P (first flow path 81) includes a recess 81*d*. The sensor 110 is provided in the recess 81*d*.

Figure 7C:
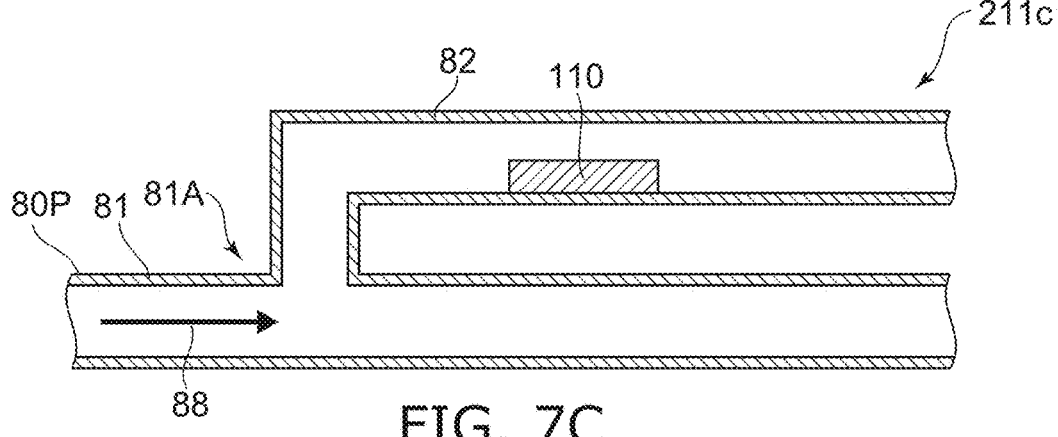

As shown in FIG. 7C, in a sensor system 211*c* according to the embodiment, the pipe 80P includes the first flow path 81 and the second flow path 82. The second flow path 82 branches off from the first flow path 81. For example, the second flow path 82 separates from the first portion 81A of the first flow path 81. The sensor 110 is provided in either the first flow path 81 or the second flow path 82. In this example, the sensor 110 is provided in second flow path 82.

Figure 7D:
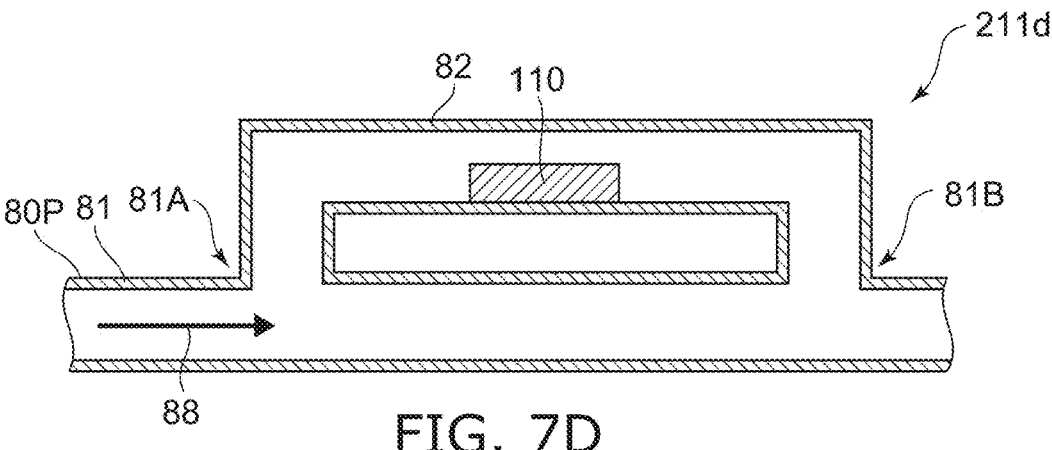

As shown in FIG. 7D, in a sensor system 211*d* according to the embodiment, the first flow path 81 includes the first portion 81A and the second portion 81B. The second flow path 82 branches off from the first portion 81A and is connected to the second portion 81B. The sensor 110 is provided in the second flow path 82. The sensor 110 may be provided in either the first flow path 81 or the second flow path 82.

Figure 8A:
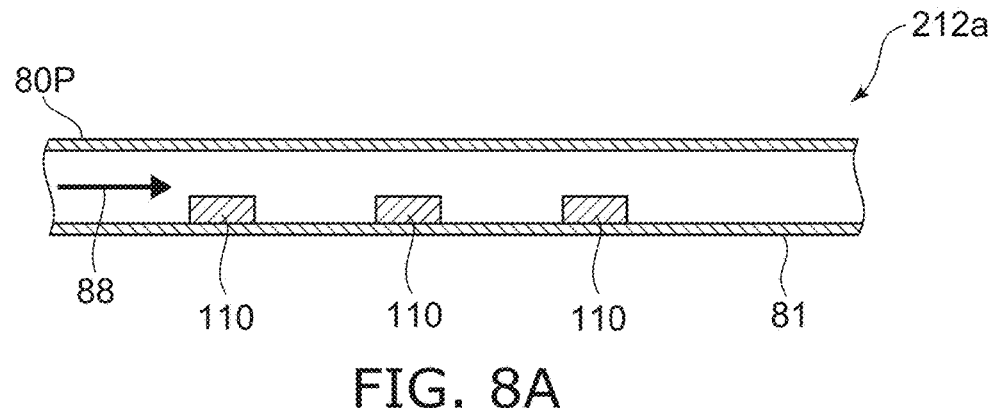
FIGS. 8A to 8C are schematic views illustrating alternative sensor systems according to the first embodiment.
Figure 8B:
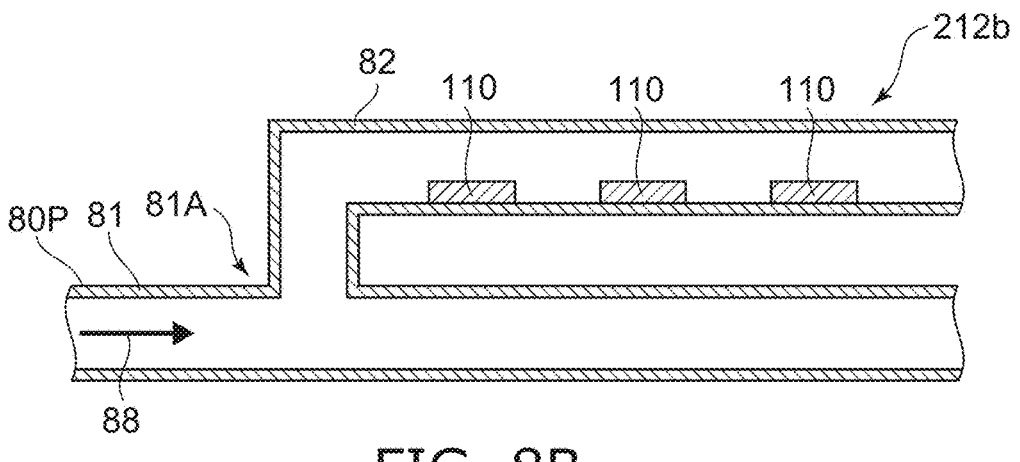
Figure 8C:
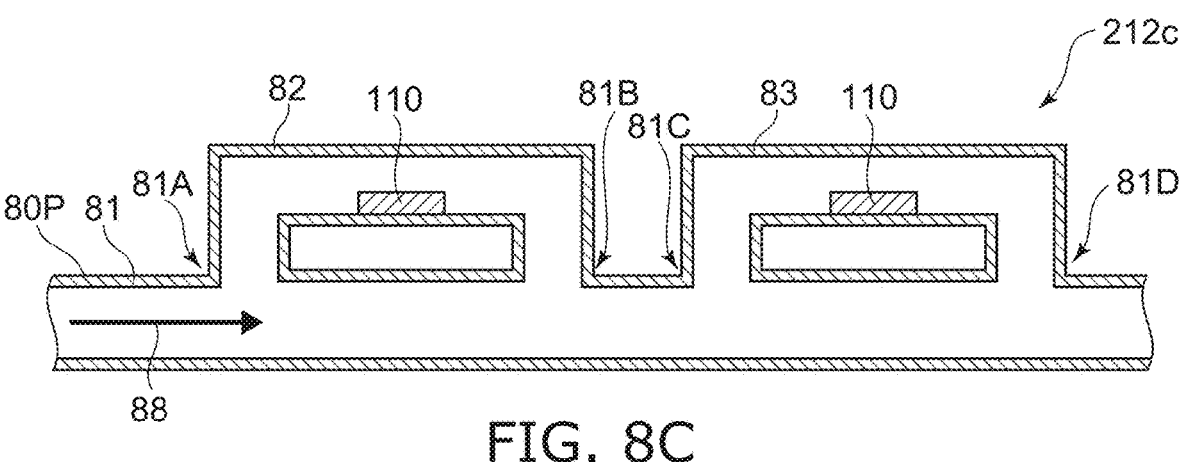

FIGS. 8A to 8C are schematic views illustrating alternative sensor systems according to the first embodiment.

As shown in FIG. 8A, multiple sensors 110 are provided in a sensor system 212*a* according to an embodiment. At least one of the multiple sensors 110 is provided inside the pipe 80P (for example, the first flow path 81).

As shown in FIG. 8B, multiple sensors 110 are provided in a sensor system 212*b* according to an embodiment. The pipe 80P includes the first flow path 81 and the second flow path 82 branched from the first flow path 81. At least two of the multiple sensors are provided in the second flow path 82.

As shown in FIG. 8C, multiple sensors 110 are provided in a sensor system 212*c* according to an embodiment. The pipe 80P includes the first flow path 81, the second flow path 82 and a third flow path 83. The first flow path 81 includes the first portion 81A, the second portion 81B, a third portion 81C and a fourth portion 81D. The second flow path 82 branches from the first portion 81A and is connected to the second portion 81B. The third flow path 83 branches off from the third portion and is connected to the fourth portion 81D. At least one of the multiple sensors 110 is provided in the second flow path 82. Another one of the multiple sensors 110 is provided in the third flow path 83.

By providing multiple sensors 110, detection with higher accuracy becomes possible. For example, if one of the sensors 110 fails, it can be detected by the other sensor 110. More stable detection becomes possible.

Another example of the sensor according to the embodiment will be described below.

Figure 9:
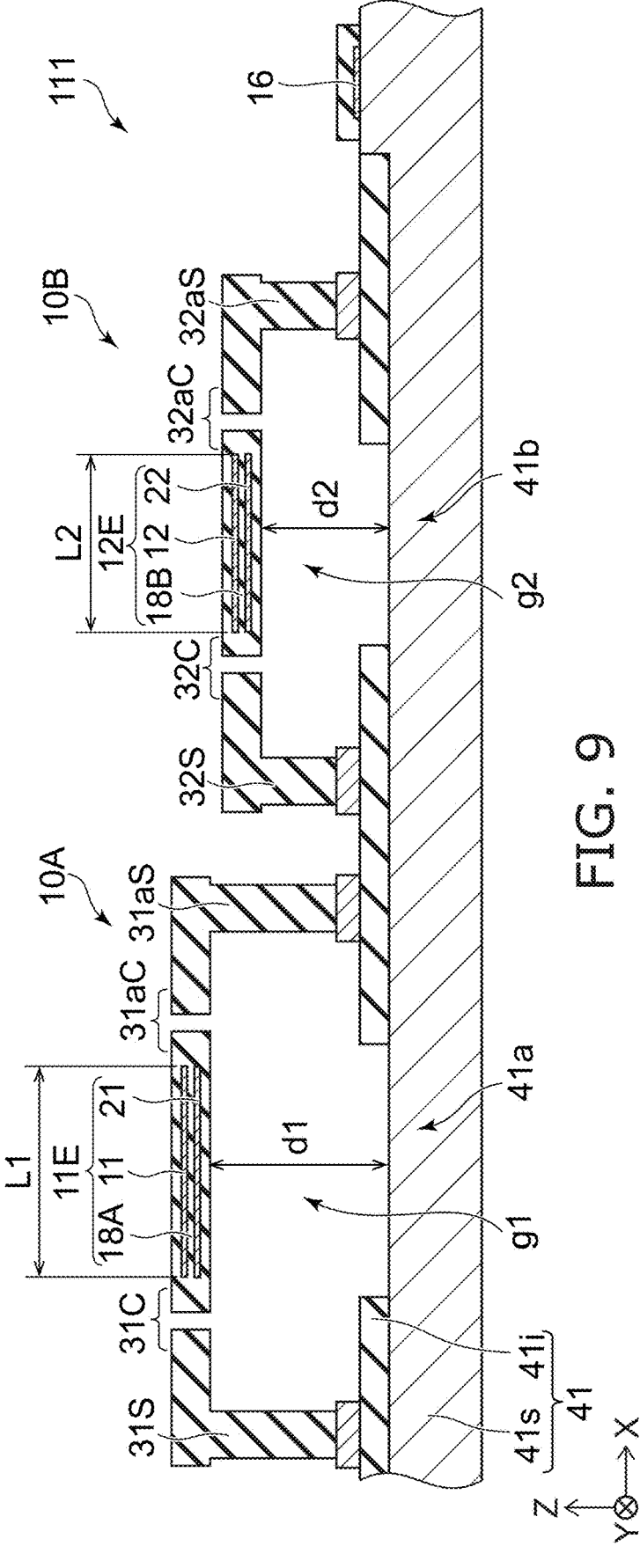
FIG. 9 is a schematic cross-sectional view illustrating a part of a sensor system according to the first embodiment.

FIG. 9 is a schematic cross-sectional view illustrating a part of the sensor system according to the first embodiment.

FIG. 9 is a cross-sectional view corresponding to the II-II' line cross section of FIG. 3. As shown in FIG. 9, in the sensor 111 according to the embodiment, the height with respect to the base 41 is different between the first detection element 11E and the second detection element 12E. Except for this, the configuration of the sensor 111 may be the same as that of the sensor 110.

In the sensor 111, a first distance d1 in the first direction (Z-axis direction) between the first base region 41*a* and the first detection element 11E is different from a second distance d2 in the first direction between the second base region 41*b* and the second detection element 12E. These distances correspond to the lengths of the gaps (first gap g1 and second gap g2). Since these distances are different from each other, the heat dissipation characteristics from these detection elements via the base 41 are different. Different heat dissipation characteristics are obtained. Using the difference in the heat dissipation characteristics enables detection with higher accuracy.

For example, the first distance d1 is longer than the second distance d2. Due to the long first distance d1, the heat dissipation through the base 41 of the first detection element 11E is suppressed more than that of the second detection element 12E. For example, the first area S1 of the first detection element 11E is larger than the second area S2 of the second detection element 12E. The difference in area and the difference in distance (difference in the length of the gap) make it possible to obtain a more effective difference in the heat dissipation characteristics.

Figure 10:
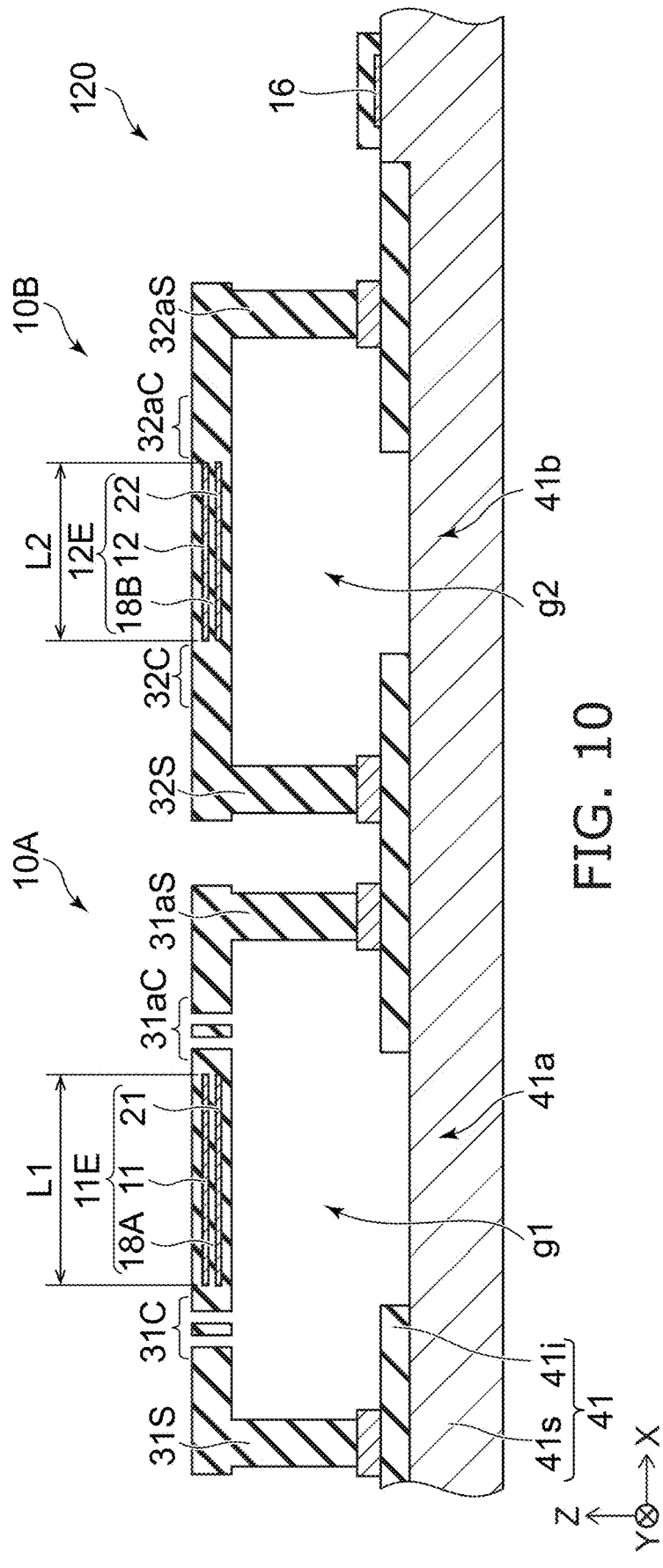
FIG. 10 is a schematic view illustrating a part of a sensor system according to the first embodiment.

FIG. 10 is a schematic view illustrating a part of a sensor system according to the first embodiment.

Figure 11:
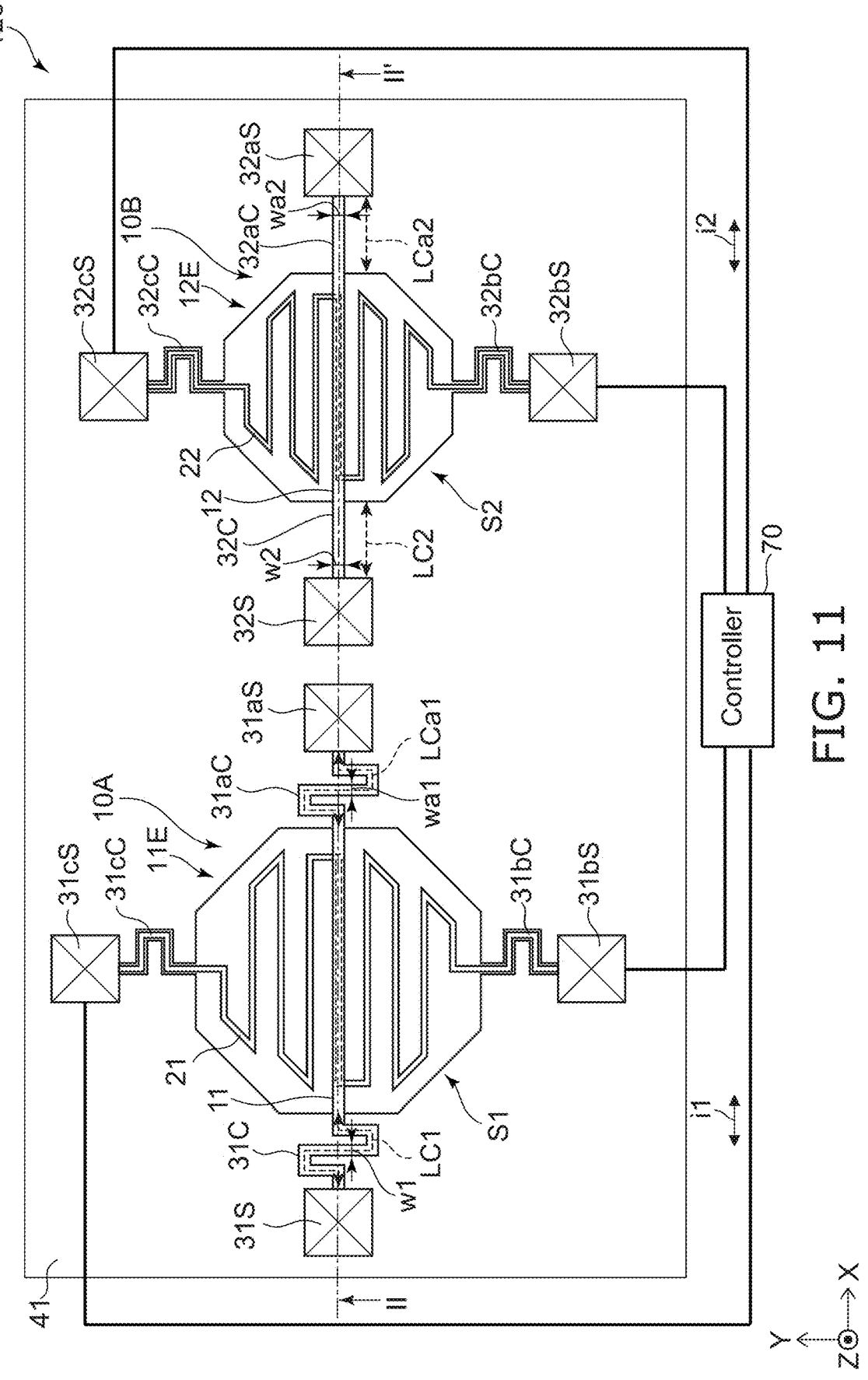
FIG. 11 is a plan view illustrating the part of the sensor system illustrated in FIG. 10.
Figure 12:
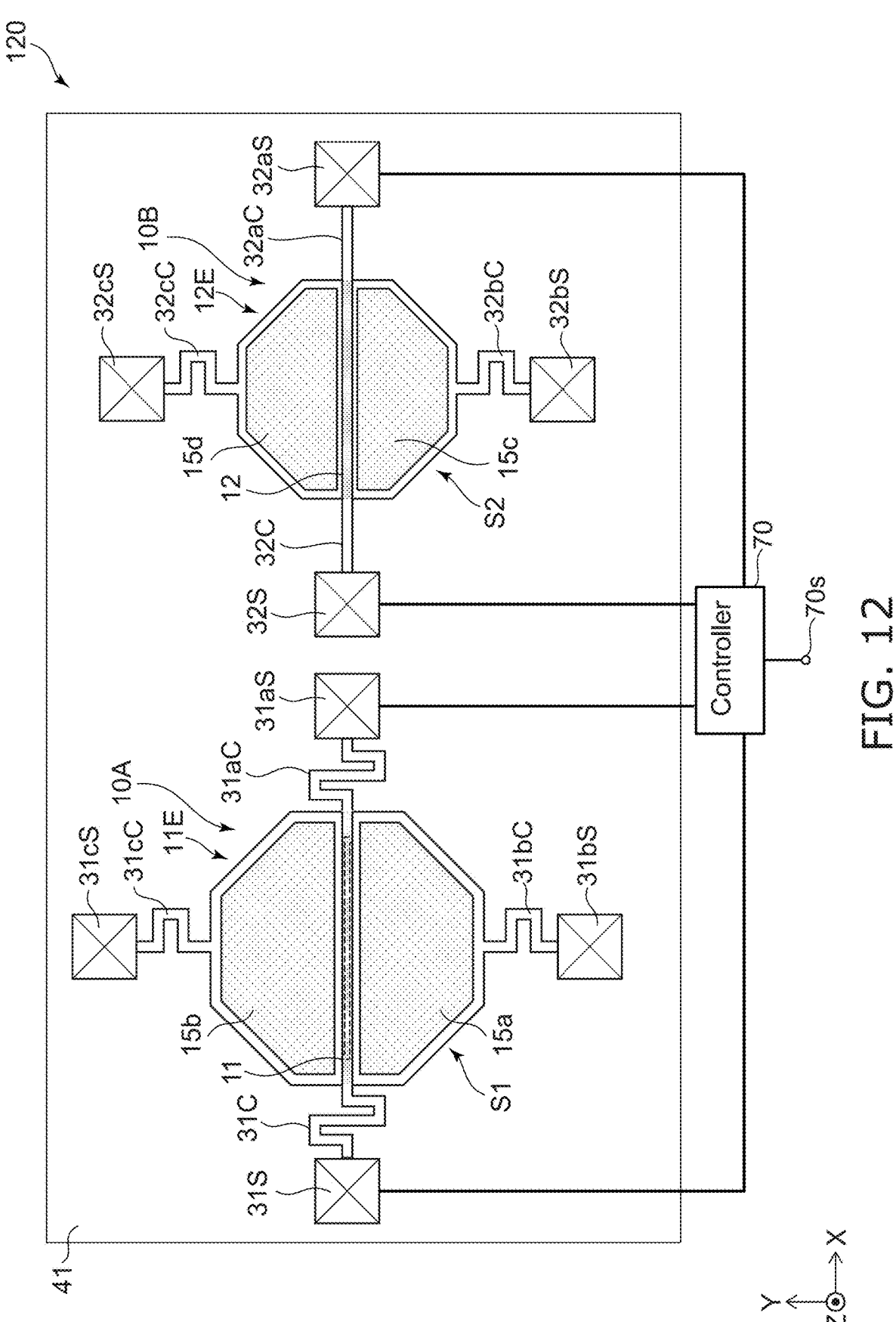
FIG. 12 is another plan view illustrating the part of the sensor system illustrated in FIG. 10.

FIG. 10 is a cross-sectional view taken along line II-II' of FIG. 11. FIGS. 11 and 12 are plan views. As shown in FIGS. 10 to 12, a sensor 120 according to the embodiment includes the base 41, the first detection part 10A and the second detection part 10B. In the sensor 120, the configuration of the connection part included in the detection part is different from that in the sensor 110. For example, the thermal resistance of the connection part included in the first detection part 10A is different from the thermal resistance of the connection part included in the second detection part 10B. Except for this, the configuration of the sensor 120 may be the same as the configuration of the sensor 110 or the sensor 111.

As shown in FIGS. 10 to 12, in the sensor 120, for example, the first detection part 10A includes the first support part 31S and the first connection part 31C. The first support part 31S is fixed to the base 41. The first connection part 31C is supported by the first support part 31S and supports the first detection element 11E. A gap g1 is provided between the first base region 41*a* and the first connection part 31C.

The second detection part 10B includes the second support part 32S and the second connection part 32C. The second support part 32S is fixed to the base 41. The second connection part 32C is supported by the second support part 32S and supports the second detection element 12E. A gap g2 is provided between the second base region 41*b* and the second connection part 32C.

As shown in FIG. 11, in the sensor 120, the first connection part 31C has a first connection part length LC1. The first connection part length LC1 is a length of the first connection part 31C along the path (first connection part path) between the first support part 31S and the first detection element 11E.

As shown in FIG. 11, the second connection part 32C has a second connection part length LC2. The second connection part length LC2 is a length of the second connection part 32C along the path (second connection part path) between the second support part 32S and the second detection element 12E. The second connection part length LC2 is different from the first connection part length LC1. This length difference provides a difference in the thermal resistance from the connection part. For example, a difference is provided in the heat dissipation characteristics through the connection part. It is possible to detect the detection target substance with higher accuracy by utilizing the difference in the heat dissipation characteristics through the connection part. According to the embodiment, it is possible to provide a sensor whose characteristics can be improved. For example, the concentration of each of multiple substances of different types can be detected with high accuracy. In the embodiment, the measurement time is short.

As shown in FIG. 11, in the sensor 120, the first other connection part 31$a$C has a first other connection part length LCa1. The first other connection part length LCa1 is a length of the first other connection part 31$a$C along the path (first other connection part path) between the first other support part 31$a$S and the first detection element 11E.

As shown in FIG. 11, the second other connection part 32$a$C has a second other connection part length LCa2. The second other connection part length LCa2 is a length of the second other connection part 32$a$C along the path (second other connection part path) between the second other support part 32$a$S and the second detection element 12E. The second other connection part length LCa2 is different from the first other connection part length LCa1. Such a length difference provides a difference in the thermal resistance from the other connection part.

In this example, the second connection part length LC2 is shorter than the first connection part length LC1. Also in this example, the second other connection part length LCa2 is shorter than the first other connection part length LCa1.

In the sensor 120, the first area S1 may be the same as or different from the second area S2. In this example, the first area S1 is larger than the second area S2. In this case, the second connection part length LC2 is shorter than the first connection part length LC1. A difference in the heat dissipation characteristics based on a difference in the area and a difference in the heat dissipation characteristics based on a difference in the length of the connection part are used. Thereby, the difference in the heat dissipation characteristics can be obtained more effectively.

In the embodiment, for example, the length of connection part 31$b$C along the path of connection part 31$b$C may be different than the length of connection part 32$b$C along the path of connection part 32$b$C. The length of the connection part 31$c$C along the path of the connection part 31$c$C may differ from the length of the connection part 32$c$C along the path of the connection part 32$c$C.

As shown in FIG. 11, the first connection part 31C has a first connection part width w1. The first connection part width w1 is a width of the first connection part 31C along a direction crossing the first connection part path between the first support part 31S and the first detection element 11E. The second connection part 32C has a second connection part width w2. The second connection part width w2 is a width of the second connection part 32C in a direction crossing the second connection part path between the second support part 32S and the second detection element 12E. The second connection part width w2 may be different from the first connection part width w1. The difference in width provides a difference in the thermal resistance of the connection part. It is possible to detect the detection target substance with higher accuracy by utilizing the difference in the heat dissipation characteristics through the connection part. According to the embodiment, it is possible to provide a sensor whose characteristics can be improved. For example, the concentration of each of multiple substances of different types can be detected with high accuracy.

As shown in FIG. 11, the first other connection part 31$a$C has a first other connection part width wa1. The first other connection part width wa1 is a width of the first other connection part 31$a$C in a direction crossing the first other connection part path between the first other support part 31$a$S and the first detection element 11E. The second other connection part 32$a$C has a second other connection part width wa2. The second other connection part width wa2 is a width of the second other connection part 32$a$C in a direction crossing the second other connection part path between the second other support part 32$a$S and the second detection element 12E. The second other connection part width wa2 is different from the first other connection part width wa1. The difference in width provides a difference in the thermal resistance of the connection part.

In the sensor 120, at least one of a length difference and a width difference may be provided between the connection part of the first detection part 10A and the connection part of the second detection part 10B.

Figure 13:
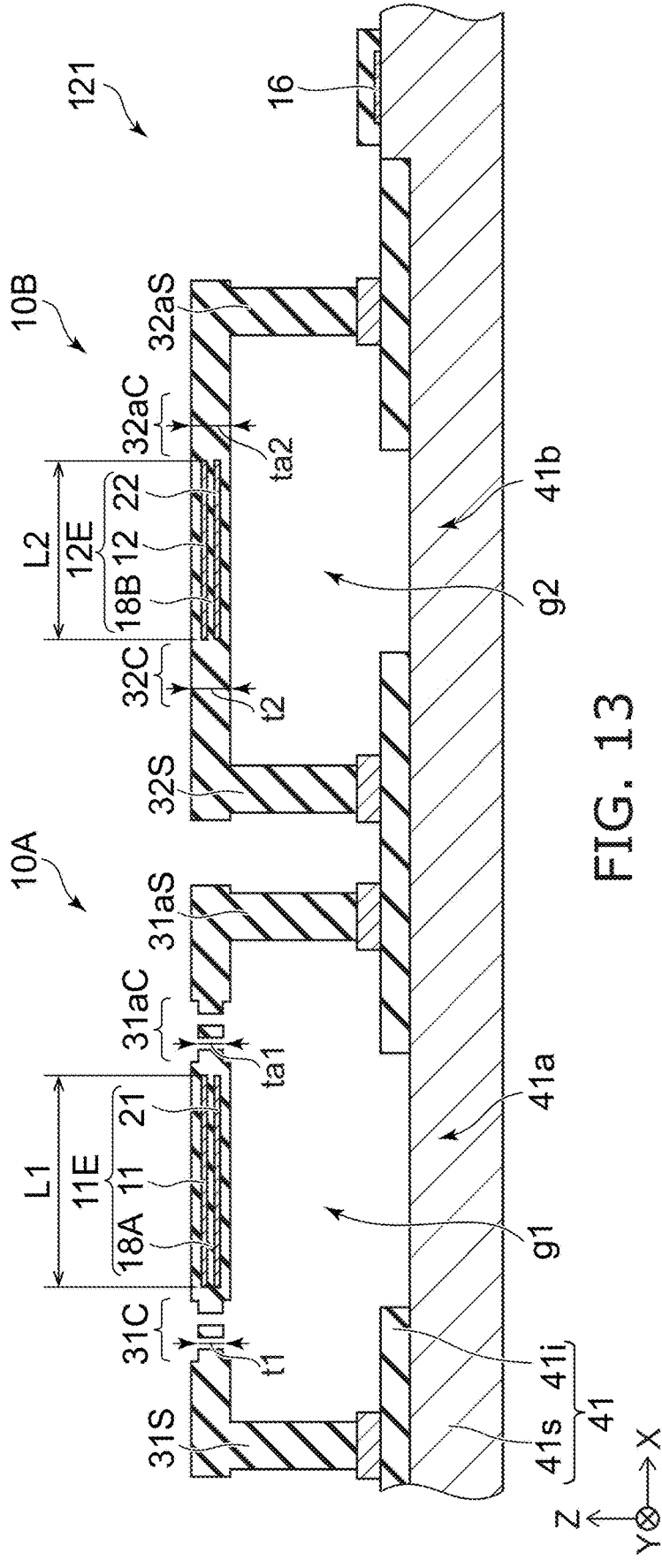
FIG. 13 is a schematic cross-sectional view illustrating a part of a sensor system according to the first embodiment.

FIG. 13 is a schematic cross-sectional view illustrating a part of a sensor system according to the first embodiment.

FIG. 13 is a cross-sectional view corresponding to the II-II' line section of FIG. 11. As shown in FIG. 13, in the sensor 121 according to the embodiment, thicknesses of the connection parts are different between the multiple detection elements. Except for this, the configuration of the sensor 121 may be the same as the configuration of the sensor 110 or the sensor 111.

As shown in FIG. 13, in the sensor 121, the first connection part 31C has a first connection part thickness t1. The first connection part thickness t1 is a thickness of the first connection part 31C in the first direction (Z-axis direction). The second connection part 32C has a second connection part thickness t2. The second connection part thickness t2 is a thickness of the second connection part 32C in the first direction (Z-axis direction). The second connection part thickness t2 is different from the first connection part thickness t1. This thickness difference provides a difference in the thermal resistance of the connection part. For example, a difference is provided in the heat dissipation characteristics through the connection part. It is possible to detect the detection target substance with higher accuracy by utilizing the difference in the heat dissipation characteristics through the connection part. According to the embodiment, it is possible to provide a sensor whose characteristics can be improved. For example, the concentration of each of multiple substances of different types can be detected with high accuracy. In the embodiment, the measurement time is short.

In the sensor 121, the first other connection part 31$a$C has a first other connection part thickness ta1. The first other connection part thickness ta1 is a thickness of the first other connection part 31$a$C in the first direction (Z-axis direction). The second other connection part 32$a$C has a second other connection part thickness ta2. The second other connection part thickness ta2 is a thickness of the second other connection part 32$a$C in the first direction (Z-axis direction). The second other connection part thickness ta2 is different from the first other connection part thickness ta1. This thickness difference provides a difference in the thermal resistance of the connection part. For example, a difference is provided in the heat dissipation characteristics through the connection part.

In the sensor 121, as in the example of the sensor 120, at least one of a difference in the length of the connection part and a difference in the width of the connection part may be provided. Differences in the thermal resistance of the connection parts may be provided by differences in the length of the connection parts, differences in the width of the connection parts, and differences in the thickness of the connection parts.

In this example, the second connection part thickness t2 is thicker than the first connection part thickness t1. Also in this example, the second other connection part thickness ta2 is thicker than the first other connection part thickness ta1.

In the sensor 121, the first area S1 may be the same as or different from the second area S2. In this example, the first area S1 is larger than the second area S2. In this case, the second connection part thickness t2 is thicker than the first connection part thickness t1. A difference in the heat dissipation characteristics based on a difference in the area and a difference in the heat dissipation characteristics based on a difference in the thickness of the connection part are used. Thereby, the difference in the heat dissipation characteristics can be obtained more effectively.

Figure 14:
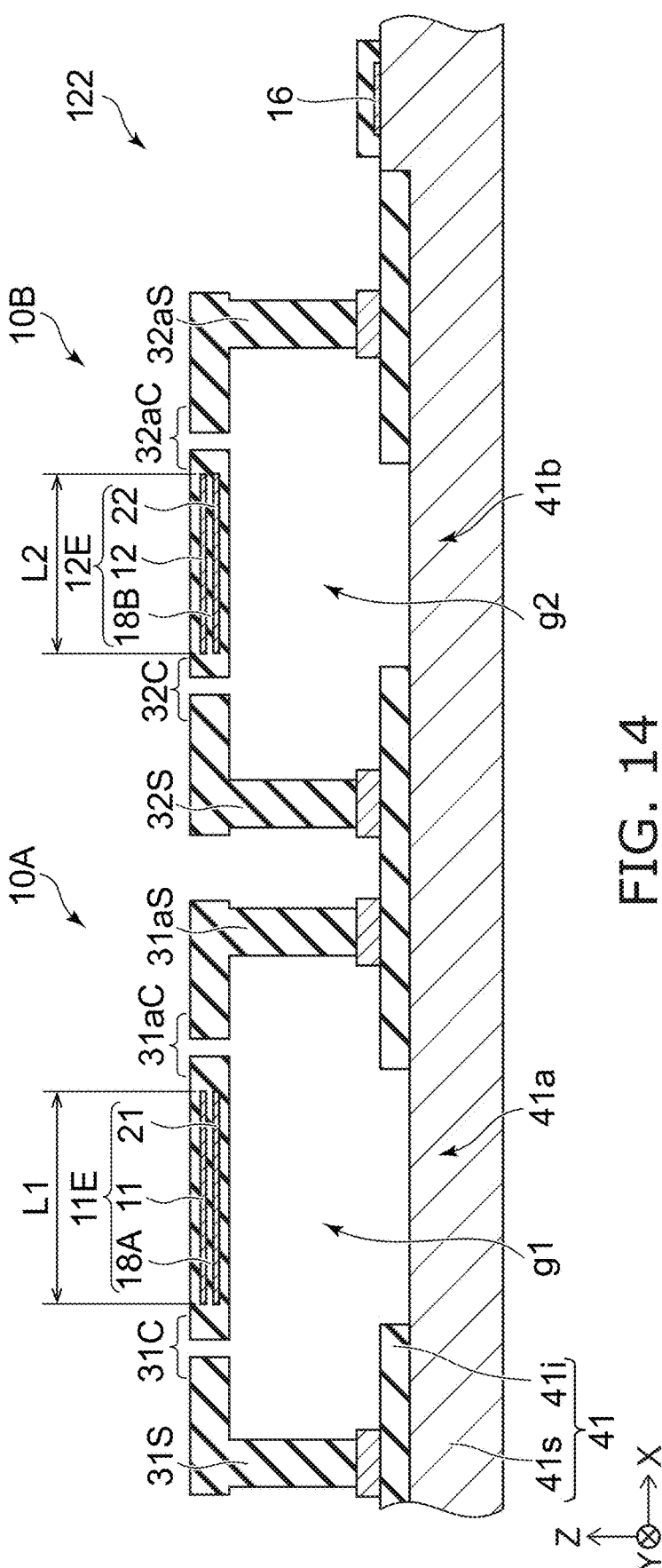
FIG. 14 is a schematic cross-sectional view illustrating a part of a sensor system according to the first embodiment.

FIG. 14 is a schematic cross-sectional view illustrating a part of a sensor system according to the first embodiment.

FIG. 14 is a cross-sectional view corresponding to the II-II' line section of FIG. 11. As shown in FIG. 14, in a sensor 122 according to the embodiment, each of the multiple detection elements is provided with a connection part. In the sensor 122, the materials of the connection parts are different from each other in the multiple detection elements. Except for this, the configuration of the sensor 122 may be the same as the configuration of the sensor 110 or the sensor 111.

In the sensor 122, the first connection part 31C includes a first connection part material. The second connection part 32C includes a second connection part material different from the first connection part material. This material difference provides a difference in the thermal resistance of the connection part. For example, a difference is provided in the heat dissipation characteristics through the connection part.

In the sensor 122, as in the example of the sensor 120, a difference in the length of the connection part may be provided. In the sensor 122, as in the example of the sensor 121, a difference in the thickness of the connection part may be provided. A difference in the thermal resistance of the connection part may be provided by at least one of a difference in the length of the connection part, a difference in the thickness of the connection part, or a difference in the material of the connection part.

For example, the thermal conductivity of the second connection part material is different from the thermal conductivity of the first connection part material. For example, the thermal conductivity of the second connection part material is higher than the thermal conductivity of the first connection part material.

In the sensor 122, the first area S1 may be the same as or different from the second area S2. In this example, the thermal conductivity of the second connection part material is higher than the thermal conductivity of the first connection part material. A difference in the heat dissipation characteristics based on a difference in the area and a difference in the heat dissipation characteristics based on a difference in the thermal conductivity of the connection part are utilized. Thereby, the difference in the heat dissipation characteristics can be obtained more effectively.

The configurations of the sensors 120-122 may be combined. For example, the first connection part 31C includes the first connection part length LC1, the first connection part width w1, the first connection part thickness t1, and the first connection part material. The first connection part length LC1 is a length of the first connection part 31C along the first connection part path between the first support part 31S and the first detection element 11E. The first connection part width w1 is a width of the first connection part 31C in a direction crossing the first connection part path. The first connection part thickness t1 is a thickness of the first connection part 31C in the first direction (Z-axis direction).

The second connection part 32C may include at least one of the second connection part length LC2 different from the first connection part length LC1, the second connection part width w2 different from the first connection part width w1, and the second connection part thickness t2 different from the first connection part thickness t1 or the second connection part material different from the first connection part material. The second connection part length LC2 is a length of the second connection part 32C along the second connection part path between the second support part 32S and the second detection element 12E. The second connection part width w2 is a width of the second connection part 32C in a direction crossing the second connection part path. The second connection part thickness t2 is a thickness of the second connection part 32C in the first direction (Z-axis direction).

For example, in one example, the second connection part length LC2 is shorter than the first connection part length LC1. The second connection part width w2 is greater than the first connection part width w1. The second connection part thickness t2 is thicker than the first connection part thickness t1. The thermal conductivity of the second connection part material is higher than the thermal conductivity of the first connection part material. For example, the second connection part 32C includes at least one of the second connection part length LC2 shorter than the first connection part length LC1, the second connection part width w2 larger than the first connection part width w1, the second connection part thickness t2 thicker than the first connection part thickness t1, or the thermal conductivity of the second connection part material higher than the thermal conductivity of the first connection part material. The difference in the thermal resistance is effectively obtained.

For example, the first other connection part 31aC includes the first other connection part length LCa1, the first other connection part width wa1, the first other connection part thickness ta1, and the first other connection part material. The first other connection part length LCa1 is a length of the first other connection part 31aC along the first other connection part path between the first other support part 31aS and the first detection element 11E. The first other connection part width wa1 is a width of the first other connection part 31aC in a direction crossing the first other connection part path. The first other connection part thickness ta1 is a thickness of the first other connection part 31aC in the first direction (Z-axis direction).

For example, the second other connection part 32aC may include at least one of the second other connection part length LCa2 different from the first other connection part length LCa1, the second other connection part width wa2 different from the first other connection part width wa1, the second other connection part thickness ta2 different from the first other connection part thickness ta1, or the second other connection part material different from the first other connection part material. The second other connection part length LCa2 is a length of the second other connection part 32aC along the second other connection part path between the second other support part 32aS and the second detection element 12E. The second other connection part width wa2 is a width of the second other connection part 32aC in a direction crossing the second other connection part path. The second other connection part thickness ta2 is a thickness of the second other connection part 32aC in the first direction (Z-axis direction).

For example, in one example, the second other connection part length LCa2 is shorter than the first other connection part length LCa1. The second other connection part width wa2 is larger than the first other connection part width wa1. The second other connection part thickness ta2 is thicker than the first other connection part thickness ta1. The thermal conductivity of the second other connection part material is higher than the thermal conductivity of the first other connection part material. A difference in the thermal resistance is effectively obtained.

Figure 15:
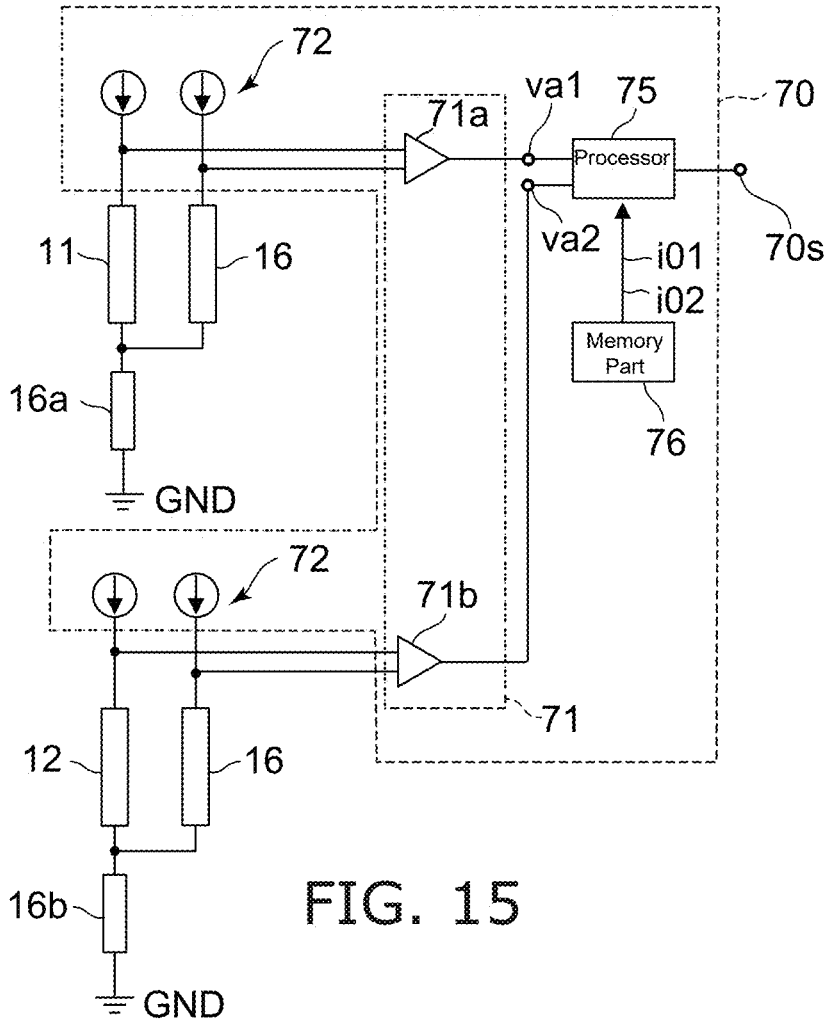
FIG. 15 is a schematic view illustrating a part of a sensor system according to the first embodiment.

FIG. 15 is a schematic view illustrating a part of a sensor system according to the first embodiment.

FIG. 15 shows an example of the controller 70. As already described, the sensor according to the embodiment (e.g., sensor 110) may include the resistance element 16 provided on the base 41.

As shown in FIG. 15, the controller 70 may include a differential circuit 71. The differential circuit 71 may include a first differential circuit 71a and a second differential circuit 71b.

In this example, the first resistance member 11 and the resistance element 16 are electrically connected in parallel. A resistor 16a is connected in series to the first resistance member 11 and the resistance element 16 and electrically connected to the ground GND. A current is supplied from the constant current source 72 to the first resistance member 11 and the resistance element 16 which are connected in parallel. A voltage of the first resistance member 11 is input to one input terminal of the first differential circuit 71a. A voltage of the resistance element 16 is input to another input terminal of the first differential circuit 71a.

The second resistance member 12 and the resistance element 16 are electrically connected in parallel. A resistor 16b is connected in series to the second resistance member 12 and the resistance element 16 and electrically connected to the ground GND. A current is supplied from the constant current source 72 to the second resistance member 12 and the resistance element 16 which are connected in parallel. A voltage of the second resistance member 12 is input to one input terminal of the second differential circuit 71b. A voltage of the resistance element 16 is input to another input terminal of the second differential circuit 71b.

The differential circuit 71 (first differential circuit 71a) can derive a value (first value va1) corresponding to a difference between a potential corresponding to the electrical resistance of the resistance element 16 and a potential corresponding to a first electrical resistance of the first resistance member 11. The differential circuit 71 (second differential circuit 71b) can derive a value (second value va2) corresponding to a difference between a potential corresponding to the electrical resistance of the resistance element 16 and a potential corresponding to a second electrical resistance of the second resistance member 12. These values are, for example, voltages.

In the above, a voltage may be applied to each of the first resistance member 11 and the second resistance member 12. These voltages may be the same as each other. The configuration in which the same voltage is applied simplifies the circuit, for example.

For example, the respective outputs (first value va1 and second value va2) of the first differential circuit 71a and the second differential circuit 71b are supplied to the processor 75. Detection is performed in the processor 75 based on these values. A detection signal 70s (information) including the detection result is output from the controller 70.

The controller 70 can perform the following first operation. In the first operation, the controller 70 supplies the first current i1 to the first conductive member 21 to raise the temperature of the first detection element 11E. In the first operation, the controller 70 supplies the second current i2 to the second conductive member 22 to raise the temperature of the second detection element 12E. The controller 70 derives the first value va1 corresponding to the first electrical resistance of the first resistance member 11 in the first operation. The controller 70 derives the second value va2 corresponding to the second electrical resistance of the second resistance member 12 in the first operation.

In the first operation, the controller 70 can output the detection signal 70s including the first detection value corresponding to a concentration of the first substance included in the space around the first detection element 11E and the second detection element 12E, and the second detection value corresponding to a concentration of the second substance included in the space described above based on the first value va1 and the second value va2. The first detection value and the second detection value may be obtained, for example, by the processor 75 included in the controller 70.

For example, the controller 70 (processor 75) can derive the first detection value and the second detection value based on first information i01 and second information i02 (see FIG. 15). For example, the first information i01 relates to the relationship between the concentration of the first substance for the first detection element 11E and the first value va1, and the relationship between the concentration of the second substance for the first detection element 11E and the first value va1. The second information i02 relates to the relationship between the concentration of the first substance for the second detection element 12E and the second value va2, and the relationship between the concentration of the second substance for the second detection element 12E and the second value va2.

The first information i01 is, for example, acquired in advance for the first detection element 11E. The second information i02 is, for example, acquired in advance for the second detection element 12E. These pieces of information may include a formula (for example, an approximation formula) showing the relationship between the concentration and the value. These pieces of information may be a table including the relationship between the concentration and the value.

As shown in FIG. 15, a memory part 76 may be provided. The controller 70 may include the memory part 76. The memory part 76 stores the first information i01 and the second information i02. The controller 70 (processor 75) reads the first information i01 and the second information i02 from the memory part 76. Based on the read first information i01 and second information i02 and the measured first value va1 and second value va2, the processor 75 can output the detection signal 70s including the first detection value corresponding to the concentration of the first substance included in the space around the first detection element 11E and the second detection element 12E, and the second detection value corresponding to the concentration of the second substance included in the space.

Figure 16A:
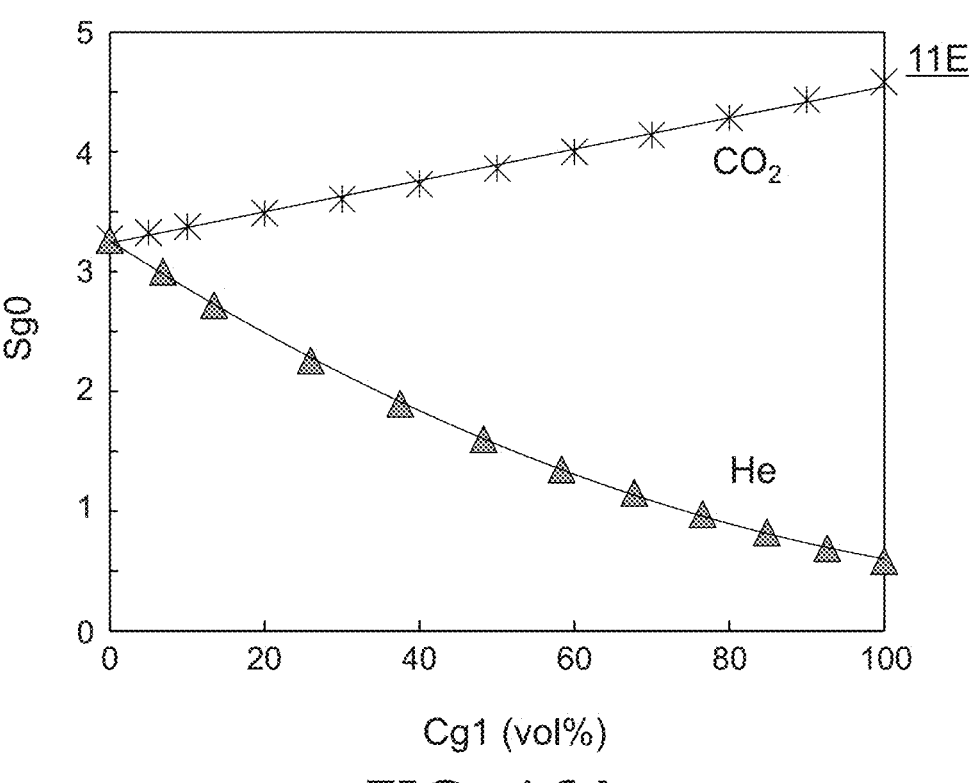
FIGS. 16A and 16B are graphs illustrating characteristics in a sensor system according to the first embodiment.
Figure 16B:
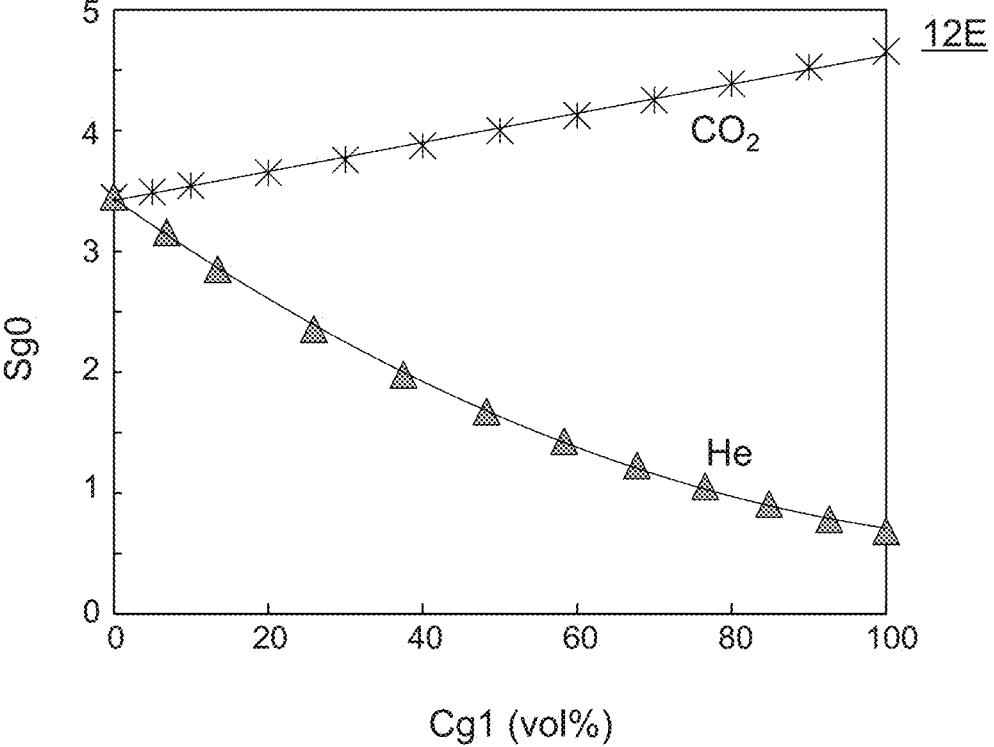

FIGS. 16A and 16B are graphs illustrating characteristics in a sensor system according to the first embodiment.

FIG. 16A corresponds to the first detection element 11E. FIG. 16B corresponds to the second detection element 12E. The horizontal axis of these figures is a concentration Cg1 of the substance included in the space. These figures illustrate the characteristics when the first substance included in the space is carbon dioxide ($CO_2$) and the characteristics when the second substance included in the space is helium (He). In these cases, the space includes nitrogen ($N_2$) as a third substance in addition to the above substances. When the first substance is carbon dioxide, the concentration Cg1 corresponds to a concentration of the first substance with respect to the sum of carbon dioxide (first substance) and nitrogen (third substance). If the second substance is helium, the concentration Cg1 corresponds to a concentration of the second substance relative to the sum of helium (second substance) and nitrogen (third substance). The vertical axis of FIG. 16A is a signal value Sg0 (for example, voltage) obtained from the first detection element 11E. The vertical axis of FIG. 16B is a signal value Sg0 (for example, voltage) obtained from the second detection element 12E.

As shown in FIGS. 16A and 16B, the signal value Sg0 depends on the concentration Cg1. In this example, the signal value Sg0 related to carbon dioxide is approximately represented by a linear function of the carbon dioxide concentration Cg1. The helium-related signal value Sg0 is approximately represented by a quadratic function of the helium concentration Cg1.

Regarding carbon dioxide, at least one coefficient included in the linear function differs between the first detection element 11E and the second detection element 12E. Regarding helium, at least one coefficient included in the quadratic function is different between the first detection element 11E and the second detection element 12E. The above coefficient relating to carbon dioxide is at least a part of the first information i01. The above coefficient related to helium is at least a part of the second information i02. Such characteristics are acquired in advance and stored in the memory part 76, for example.

For example, a function for the signal value Sg0 when including the first substance and the second substance may be derived from these multiple functions. This function may be stored in the memory part 76.

Similarly for other substances (e.g., hydrogen or methane) the coefficients of the function may be acquired in advance. Information including these coefficients is stored in the memory part 76.

On the other hand, in detection using sensors, measurement data (first value va1 and second value va2) obtained from the first detection element 11E and the second detection element 12E are acquired. The acquired measurement data is processed using the above stored information (e.g., coefficients included in the function). Thereby, the first detection value corresponding to the concentration of the first substance and the second detection value corresponding to the concentration of the second substance are derived from the measurement data. Even when these multiple detection target substances are included in the space, each concentration of these multiple detection target substances can be detected with high accuracy.

Figure 17A:
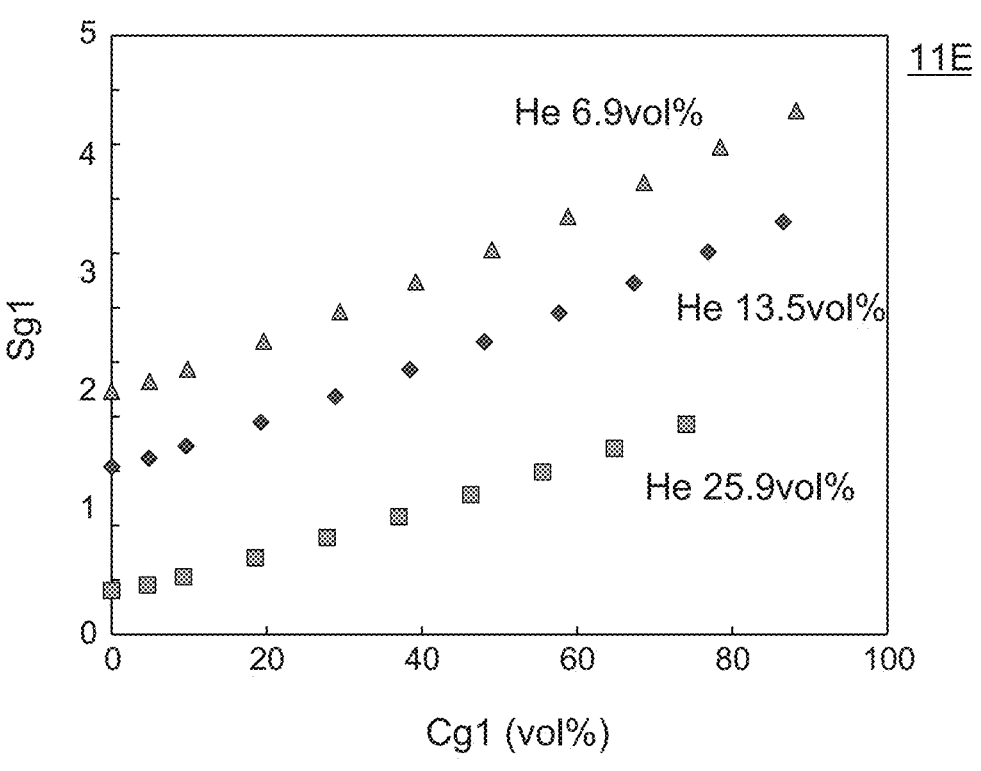
FIGS. 17A and 17B are graphs illustrating characteristics in a sensor system according to the first embodiment.
Figure 17B:
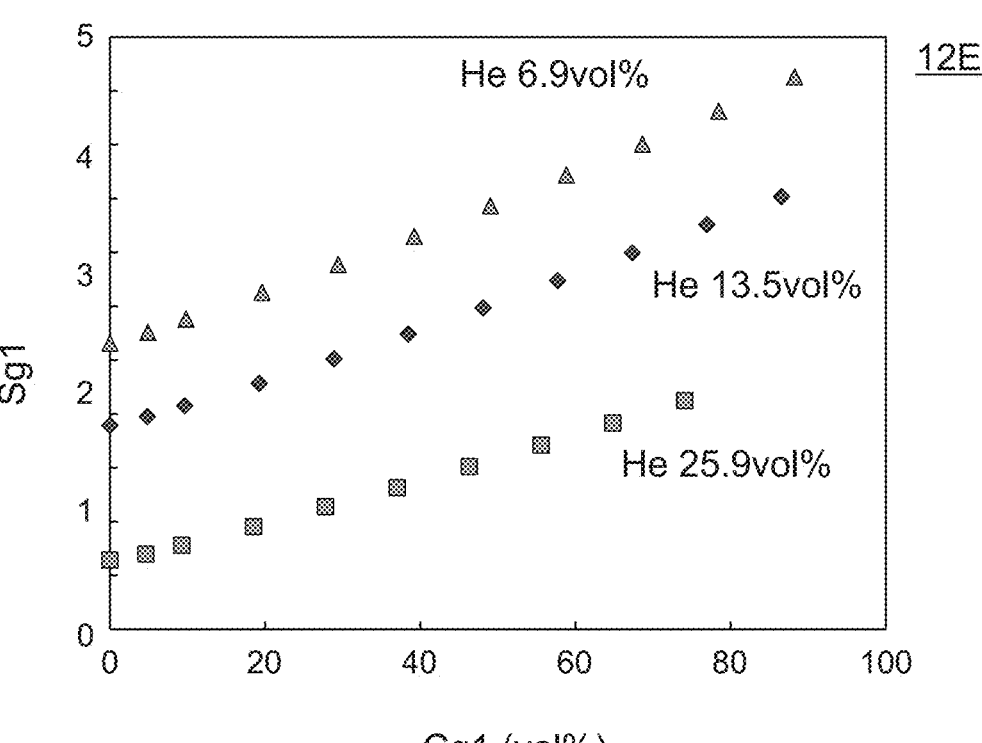

FIGS. 17A and 17B are graphs illustrating characteristics in a sensor system according to the first embodiment.

FIG. 17A corresponds to the first detection element 11E. FIG. 17B corresponds to the second detection element 12E. These figures illustrate a signal value Sg1 (for example, voltage) when the space includes carbon dioxide (first substance), helium (second substance) and nitrogen (third substance). The horizontal axis of these figures is the carbon dioxide concentration Cg1. The vertical axis of these figures is the signal value Sg1. In this example, changes in the signal value Sg1 with respect to the carbon dioxide concentration Cg1 are illustrated at helium concentrations of 6.9 vol %, 13.5 vol %, and 25.9 vol %.

As shown in FIGS. 17A and 17B, when the space includes carbon dioxide (first substance), helium (second substance) and nitrogen (third substance), carbon dioxide (first substance), the signal value Sg1 corresponding to each of the concentrations of carbon dioxide (first substance) and helium (second substance) is obtained. Based on the signal value Sg1 obtained from the first detection element 11E and the signal value Sg1 obtained from the second detection element 12E, the concentration of carbon dioxide (first substance) and the concentration of helium (second substance) can be derived.

Figure 18:
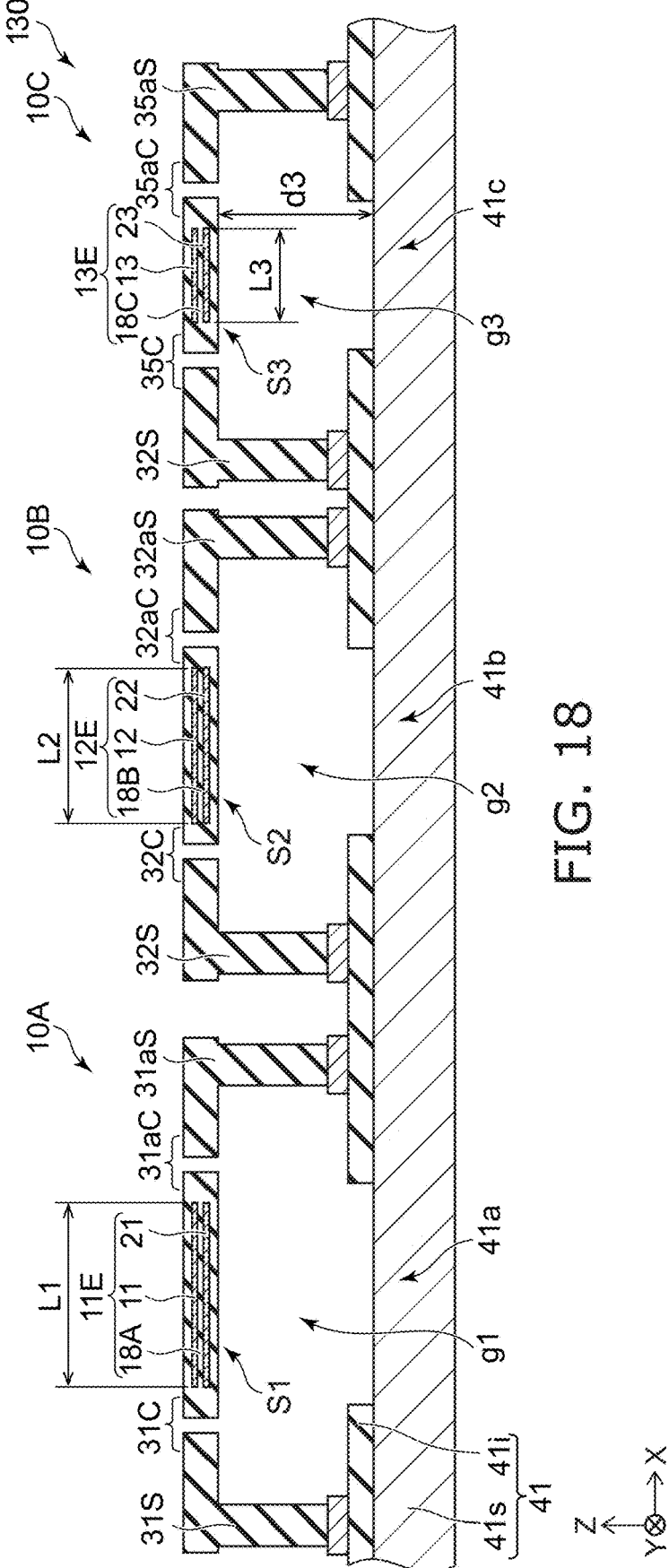
FIG. 18 is a schematic cross-sectional view illustrating a part of a sensor system according to the first embodiment.

FIG. 18 is a schematic cross-sectional view illustrating a part of a sensor system according to the first embodiment.

As shown in FIG. 18, a sensor 130 according to the embodiment may further include a third detection part 10C in addition to the first detection part 10A and the second detection part 10B. Except for this, the configuration of the sensor 130 may be the same as the configuration of the sensor according to the first embodiment or the second embodiment.

In the sensor 130, the base 41 further includes a third base region 41c. The third detection part 10C includes a third detection element 13E. The third detection element 13E includes a third resistance member 13, a third conductive member 23 and a third insulating member 18C. At least a part of the third insulating member 18C is between the third resistance member 13 and the third conductive member 23. A third gap g3 is provided between the third base region 41c and the third detection element 13E. The third detection element 13E has a third area S3 on the above plane (XY plane). The third area S3 differs from the first area S1 and differs from the second area S2.

For example, the first detection element 11E has the first length L1 in a direction crossing the first direction (Z-axis direction). The second detection element 12E has the second length L2 in a direction crossing the first direction. The third detection element 13E has a third length L3 in a direction crossing the first direction. The second length L2 is different than the first length L1. The third length L3 differs from the first length L1 and differs from the second length L2. In this example, the second length L2 is shorter than the first length L1. Also in this example, the third length L3 is shorter than the second length L2.

For example, by providing three or more detection elements with different heat dissipation characteristics, it is possible to detect substances with high accuracy even when the types of substances (gases) included in the space increase.

In the sensor 130, the third distance d3 in the first direction (Z-axis direction) between the third base region 41c and the third detection element 13E may be different from at least one of the first distance d1 (see FIG. 9) and the second distance d2 (see FIG. 9).

Figure 19:
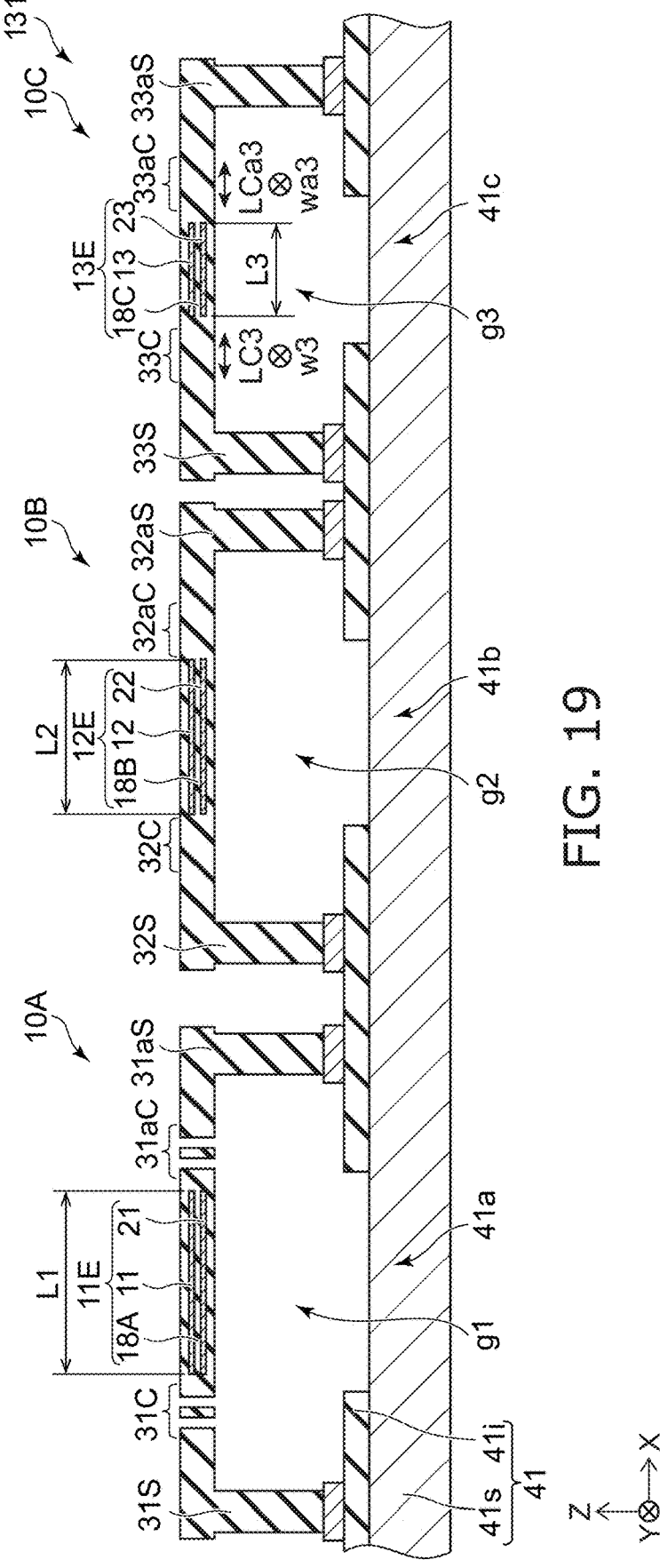
FIG. 19 is a schematic cross-sectional view illustrating a part of a sensor system according to the first embodiment.

FIG. 19 is a schematic cross-sectional view illustrating a part of a sensor system according to the first embodiment.

Figure 20:
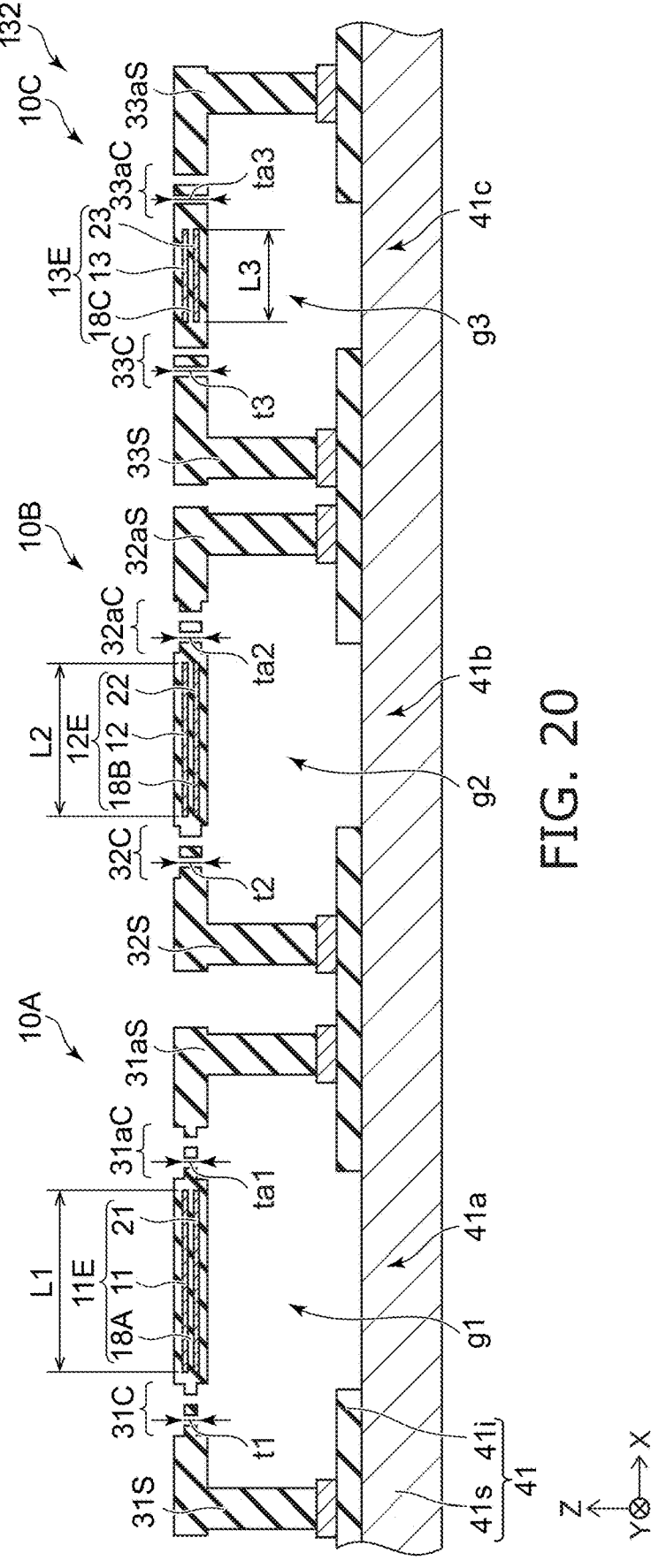
FIG. 20 is a schematic cross-sectional view illustrating a part of a sensor system according to the first embodiment.

FIG. 20 is a schematic cross-sectional view illustrating a part of a sensor system according to the first embodiment.

As shown in FIGS. 19 and 20, sensors 131 and 132 according to the embodiment further include the third detection part 10C in addition to the first detection part 10A and the second detection part 10B. Except for this, the configurations of the sensors 131 and 132 may be the same as those of the sensors according to the first embodiment or the second embodiment.

In the sensors 131 and 132, the third detection part 10C includes the third detection element 13E, a third support part 33S and a third connection part 33C. The third support part 33S is fixed to the base 41. The third connection part 33C is supported by the third support part 33S and supports the third detection element 13E. A gap (for example, a third gap g3) is provided between the third base region 41c and the third connection part 33C and between the third base region 41c and the third detection element 13E. The third detection element 13E includes the third resistance member 13 and the third conductive member 23.

In the sensor 131 and the sensor 132, the third connection part 33C includes at least one of a third connection part length LC3 different from the first connection part length LC1 (see FIG. 11) and different from the second connection part length LC2 (see FIG. 11), and a first connection part width w3 different from the second connection part width w2 (see FIG. 11) and different from the first connection part width w1 (see FIG. 11), a third connection part thickness t3 different from the first connection part thickness t1 (see FIG. 13) and different from the second connection part thickness t2 (see FIG. 13) or a third connection part material different from the first connection part material and different from the second connection part material. The third connection part length LC3 is a length of the third connection part 33C along the third connection part path between the third support part 33S and the third detection element 13E. The third connection part width w3 is a width of the third connection part 33C in a direction crossing the third connection part path. The third connection part thickness t3 is a thickness of the third connection part 33C in the first direction (Z-axis direction).

For example, the thermal resistance of the third connection part 33C is different from the thermal resistance of the first connection part 31C, and is different from the thermal resistance of the second connection part 32C.

In the sensor 131, the third connection part length LC3 is different from the first connection part length LC1 and different from the second connection part length LC2. The third connection part width w3 is different from the first connection part width w1 and is different from the second connection part width w2. In the sensor 131, the third connection part thickness t3 is different from the first connection part thickness t1 and is different from the second connection part thickness t2.

In the sensors 131 and 132, the first other connection part 31aC includes the first other connection part length LCa1 (see FIG. 11), the first other connection part width wa1 (see FIG. 11), and the first other connection part thickness ta1 (see FIG. 8), and the first other connection part material. The first other connection part length LCa1 is a length of the first other connection part 31aC along the first other connection part path between the first other support part 31aS and the first detection element 11E. The first other connection part width wa1 is a width of the first other connection part 31aC in a direction crossing the first other connection part path. The first other connection part thickness ta1 is a thickness of the first other connection part 31aC in the first direction (Z-axis direction).

The second other connection part 32aC includes at least one of the second other connection part length LCa2 (see FIG. 11) different from the first other connection part length LCa1, and a second other connection part width wa2 (see FIG. 11) different from the first other connection part width wa1, the second other connection part thickness ta2 (see FIG. 11) different from the first other connection part thickness ta1, or the second other connection part material different from the first other connection part material. The second other connection part length LCa2 is a length of the second other connection part 32aC along the second other connection part path between the second other support part 32aS and the second detection element 12E. The second other connection part width wa2 is a width of the second other connection part 32aC in a direction crossing the second other connection part path. The second other connection part thickness ta2 is a thickness of the second other connection part 32aC in the first direction (Z-axis direction).

In the sensor 131 and the sensor 132, the third other connection part 33aC includes at least one of the third other connection part length LCa3 different from the first other connection part length LCa1 (see FIG. 11) and different from the second other connection part length LCa2 (see FIG. 11), the third other connection part width wa3 different from the second other connection part width wa2 (see FIG. 11) and different from the first other connection part width wa1 (see FIG. 11), the third other connection part thickness ta3 different from the second other connection part thickness ta2 (see FIG. 13) and different from the first other connection part thickness ta1 (see FIG. 13), or the third other connection part material different from the first other connection part material and different from the second other connection part material. The third other connection part length LCa3 is a length of the third other connection part 33aC along the third other connection part path between the third other support part 33aS and the third detection element 13E. The third other connection part width wa3 is a width of the third other connection part 33aC in a direction crossing the third other connection part path. The third other connection part thickness ta3 is a thickness of the third other connection part 33aC in the first direction (Z-axis direction).

For example, the thermal resistance of the third other connection part 33aC is different from the thermal resistance of the first other connection part 31aC, and is different from the thermal resistance of the second other connection part 32aC. For example, by providing three or more detection elements with different heat dissipation characteristics, it is possible to detect substances with high accuracy even when the types of substances (gases) included in the space increase.

As already described, in the embodiment, the space around the detection element may further include a third substance in addition to the first and second substances. For example, the third substance may include at least one selected from the group consisting of nitrogen, air, carbon monoxide and oxygen. The first substance includes, for example, one selected from the group consisting of carbon dioxide, helium, methane, chlorine, sulfur hexafluoride (SF6) and hydrogen. The second substance includes, for example, another one selected from the group consisting of carbon dioxide, helium, methane, chlorine, sulfur hexafluoride (SF6) and hydrogen.

These materials have different thermal conductivities. In the embodiment, characteristics based on differences in the heat dissipation characteristics due to differences in the thermal conductivity of materials are detected.

For example, the thermal conductivity at one temperature condition is: The thermal conductivity of carbon dioxide is 14.5 mW/(m·K). The thermal conductivity of helium is 144.2 mW/(m·K). The thermal conductivity of methane is 30.4 mW/(m·K). The thermal conductivity of hydrogen is 167.5 mW/(m·K). The thermal conductivity of nitrogen is 24.1 mW/(m·K). The thermal conductivity of carbon monoxide is 23.3 mW/(m·K).

In the embodiment, the first substance may include one selected from the group consisting of carbon dioxide, helium, methane, chlorine, sulfur hexafluoride, hydrogen, ammonia and ethylene. In the embodiment, the second substance may include another one selected from the group consisting of carbon dioxide, helium, methane, chlorine, sulfur hexafluoride, hydrogen, ammonia, ethylene, and water. The second substance may include, for example, water vapor.

Figure 21:
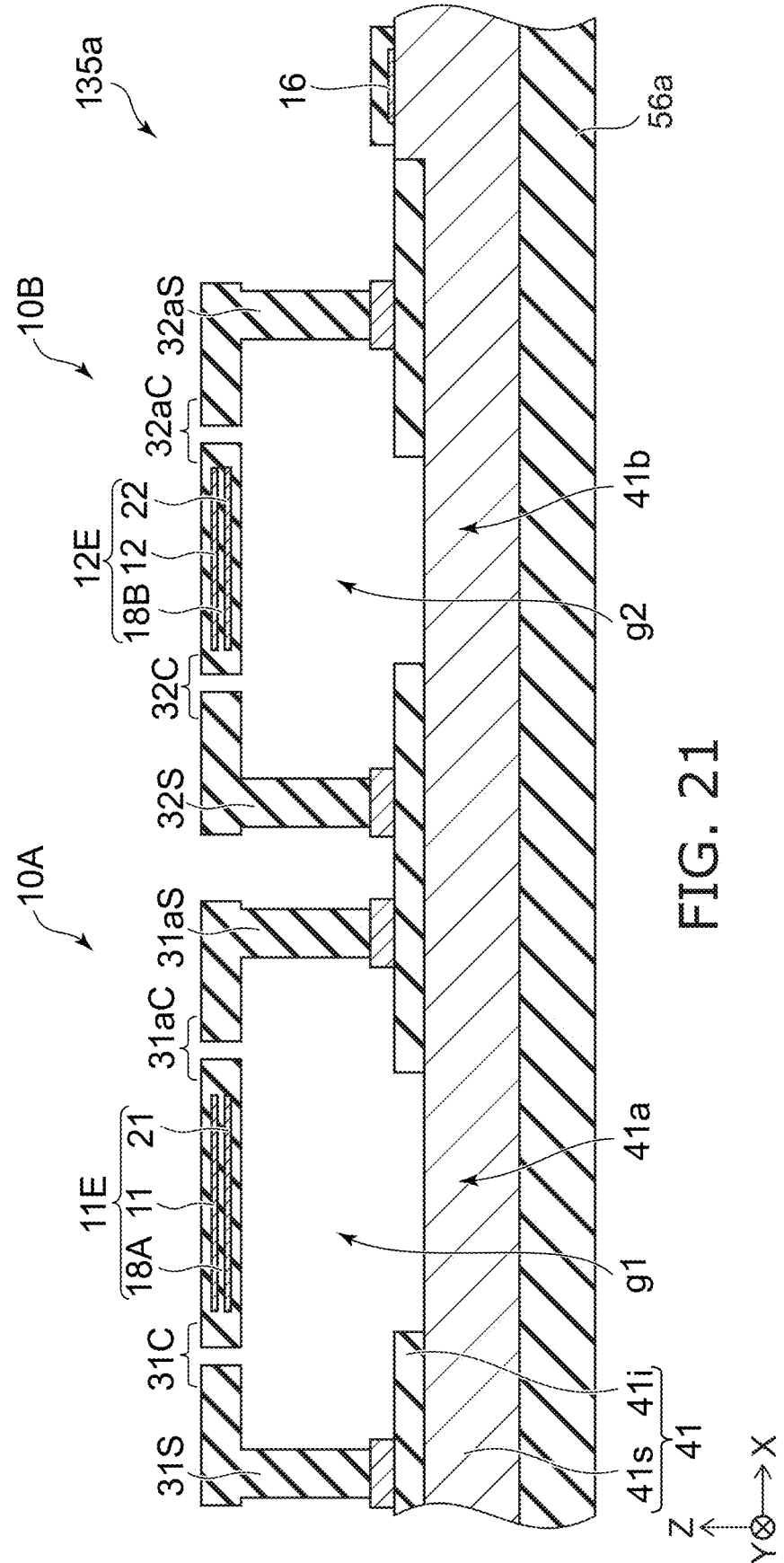
FIG. 21 is a schematic cross-sectional view illustrating a part of a sensor system according to the first embodiment.

FIG. 21 is a schematic cross-sectional view illustrating a part of 1 sensor system according to the first embodiment.

As shown in FIG. 21, a sensor 135a according to the embodiment includes a first mounting member 56a. The configuration of the sensor 135a other than this may be the same as the configuration of any sensor according to the first embodiments. As shown in FIG. 21, in the sensor 135a, the base 41 is fixed to the first mounting member 56a. The first mounting member 56a may be, for example, a printed circuit board.

Figure 22:
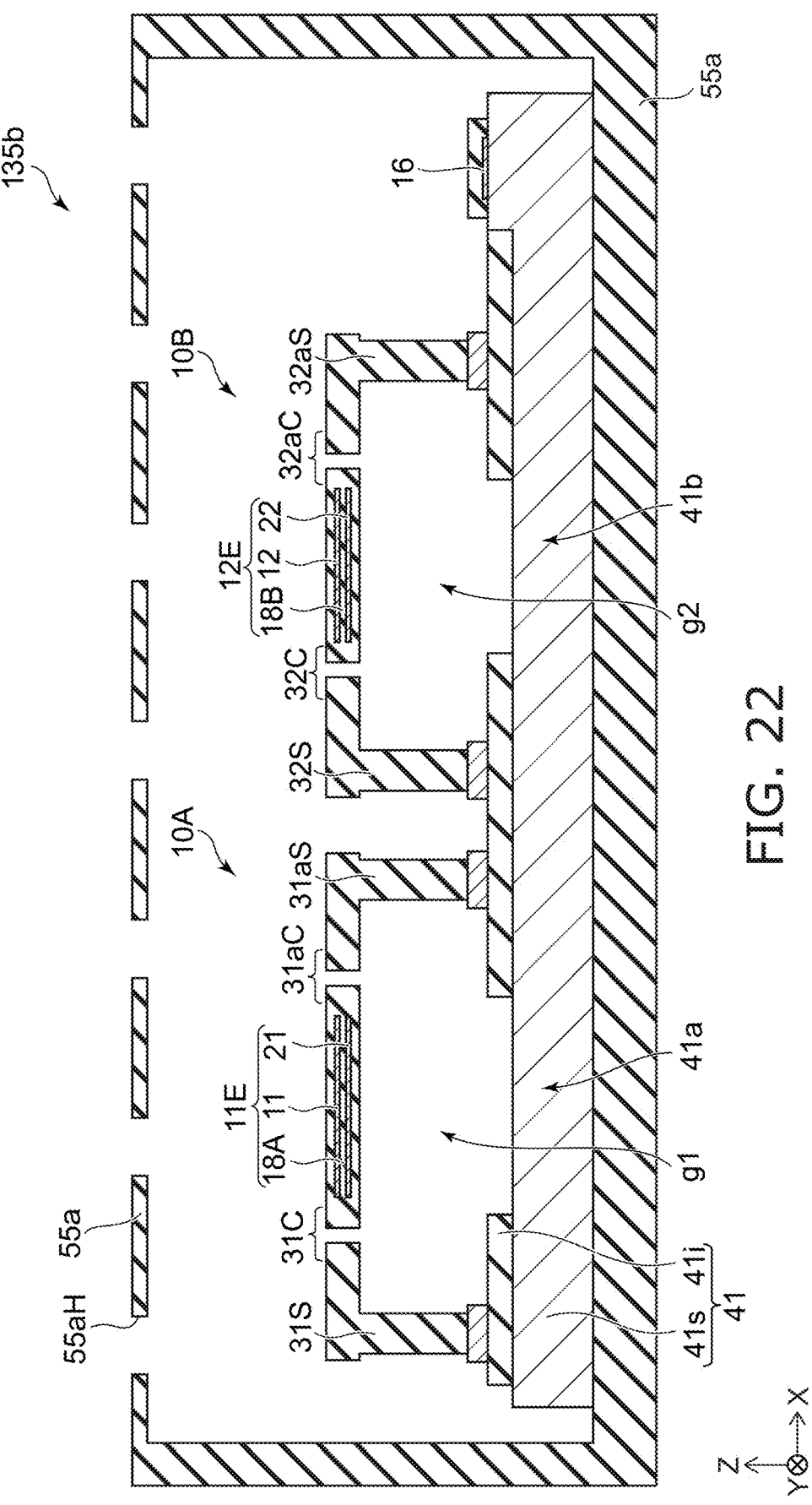
FIG. 22 is a schematic cross-sectional view illustrating a part of a sensor system according to the first embodiment.

FIG. 22 is a schematic cross-sectional view illustrating a part of 1 sensor system according to the first embodiment.

As shown in FIG. 22, a sensor 135b according to the embodiment includes the first housing 55a. The first housing 55a is, for example, a package. The configuration of the sensor 135b other than this may be the same as the configuration of any sensor according to the first embodiments. As shown in FIG. 22, in the sensor 135b, the base 41, the first detection part 10A and the second detection part 10B are provided between multiple portions of the first housing 55a. The multiple portions are, for example, a bottom of the first housing 55a and a lid of the first housing 55a.

As shown in FIG. 22, a hole 55aH is provided in a part (for example, a lid) of the first housing 55a. Multiple holes 55aH may be provided. The multiple holes 55aH serve as an entrance or an exit for the detection target substance (such as gas).

Figure 23A:
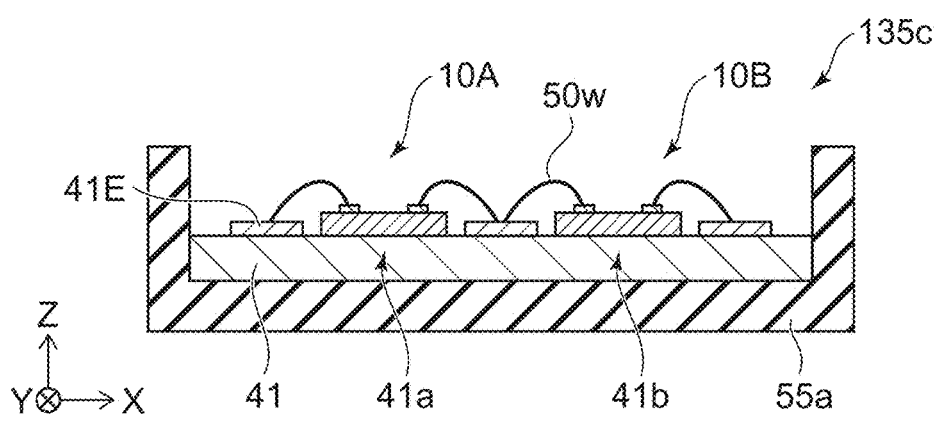
FIGS. 23A to 23C are schematic cross-sectional views each illustrating a part of a sensor system according to the first embodiment.
Figure 23B:
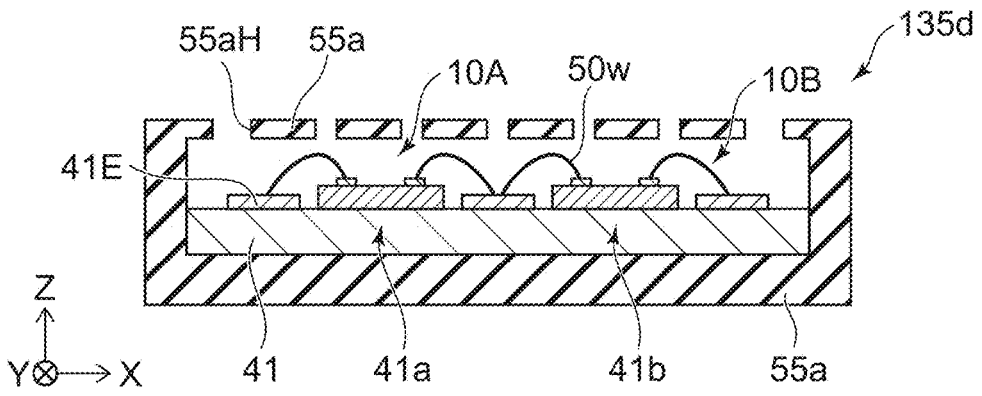
Figure 23C:
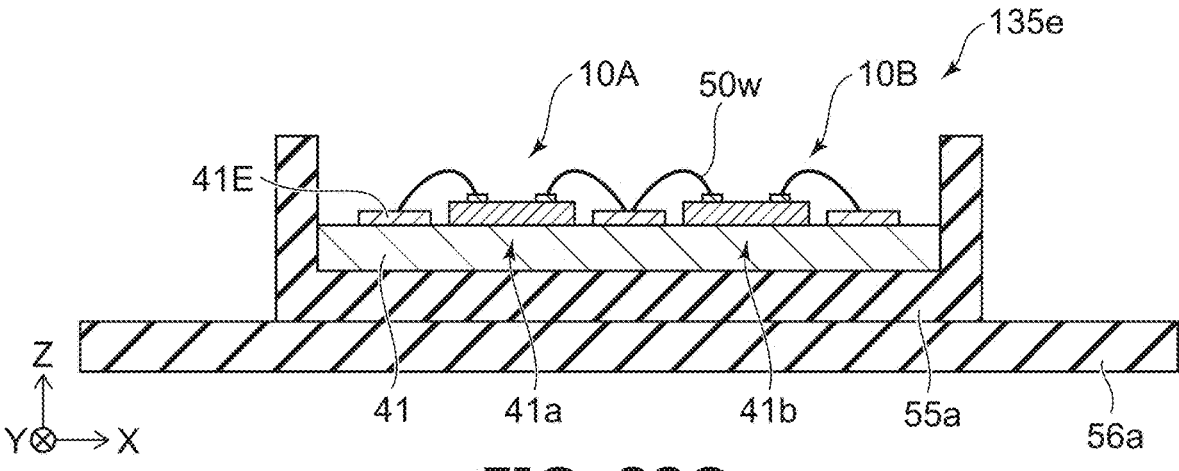

FIGS. 23A to 23C are schematic cross-sectional views each illustrating a part of a sensor system according to the first embodiment.

In a sensor 135c according to the embodiment shown in FIG. 23A, a structure including the base 41, the first detection part 10A and the second detection part 10B is fixed to the bottom of the first housing 55a. For example, the terminals included in the first detection part 10A and the terminals included in the second detection part 10B are connected to the electrodes 41E and the like provided on the base 41 by connection members (e.g., bonding wires 50w and the like). Except for this, the configuration of the sensor 135c may be the same as the configuration of any sensor according to the first embodiments.

In a sensor 135d according to the embodiment shown in FIG. 23B, the hole 55aH is provided in a portion (for example, the lid) of the first housing 55a. Multiple holes 55aH may be provided. Except for this, the configuration of the sensor 135d may be the same as the configuration of the sensor 135c.

In a sensor 135e according to the embodiment shown in FIG. 23C, the first housing 55a is fixed to a first mounting member 56a. Except for this, the configuration of the sensor 135e may be the same as the configuration of the sensor 135c or the configuration of the sensor 135d.

In the above sensors 135a to 135e, one base 41 is provided with multiple detection parts (first detection part 10A, second detection part 10B, etc.). Multiple base regions (first base region 41a, second base region 41b, etc.) in the base 41 may be continuous with each other. The first detection part 10A and the second detection part 10B may be produced simultaneously in one process. It is easy to control thermal characteristics (for example, thermal resistance or thermal conductivity) between multiple detection parts with high accuracy. It is easy to obtain higher detection results.

As described below, in the embodiment, the second base region 41b may be separate from the first base region 41a.

Figure 24:
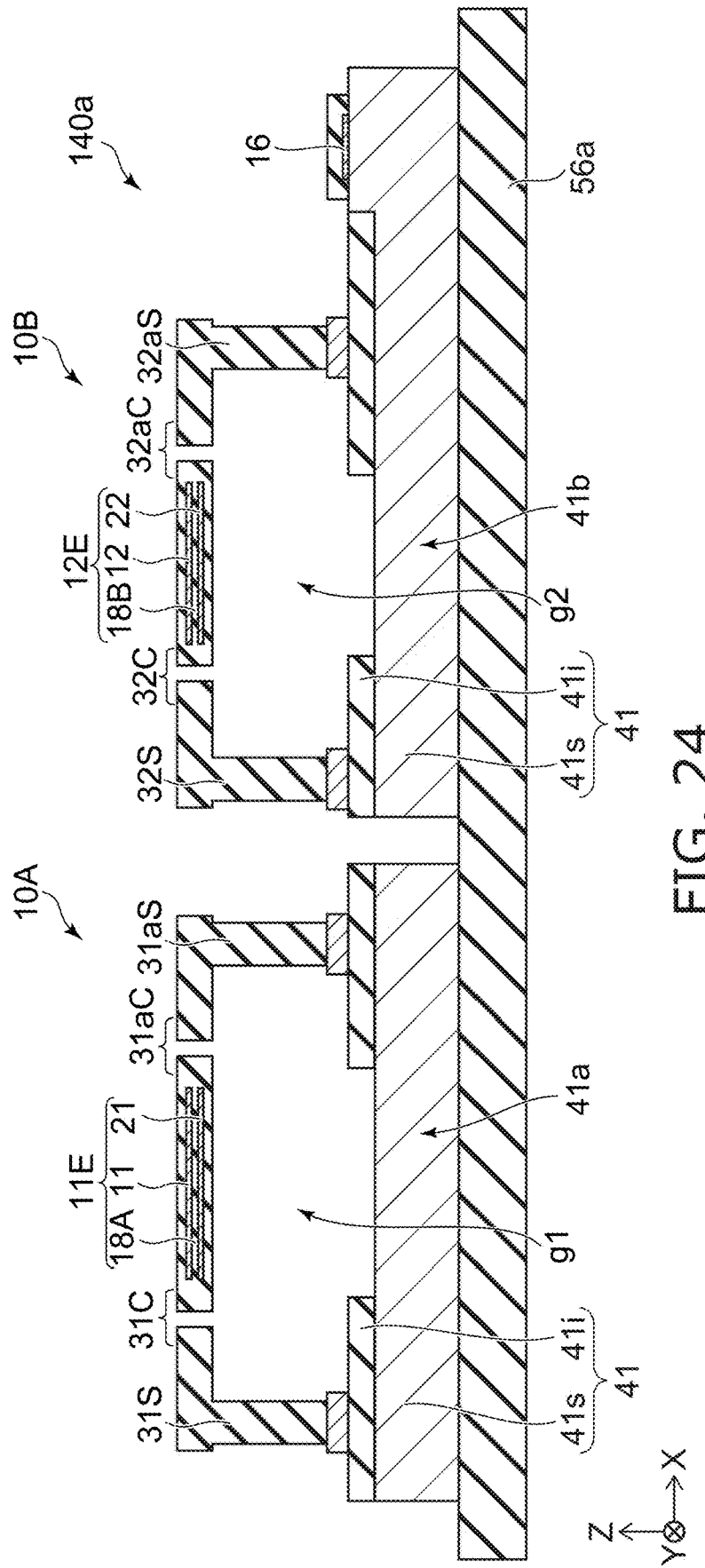
FIG. 24 is a schematic cross-sectional view illustrating a part of a sensor system according to the first embodiment.

FIG. 24 is a schematic cross-sectional view illustrating a part of a sensor system according to the first embodiment.

As shown in FIG. 24, a sensor 140a according to the embodiment includes the base 41, the first detection part 10A and the second detection part 10B. The base 41 includes the first base region 41a and the second base region 41b. The first detection part 10A includes the first support part 31S, the first connection part 31C, and the first detection element 11E. The position of the first detection part 10A with respect to the first base region 41a is fixed. The second detection part 10B includes the second support part 32S, the second connection part 32C and the second detection element 12E. The position of the second support part 32S with respect to the second base region 41b is fixed.

In a sensor 140a, the second base region 41b is separated from the first base region 41a. It may be considered that multiple bases 41 are provided in the sensor 140a. In this case, one of the multiple bases 41 may be regarded as the first base region 41a, and another one of the multiple bases 41 may be regarded as the second base region 41b.

As already described, in the sensor 140a, the first detection part 10A includes the first area S1 of the first detection element 11E, the first connection part length LC1 of the first connection part 31C, and the first connection part length LC1 of the first connection part 31C, the first connection part width w1 of the first connection part 31C, the first connection part thickness t1 of the first connection part 31C, the first connection part material of the first connection part 31C, and the first distance d1. The first distance d1 is a distance between the first base region 41a and the first detection element 11E.

As already described, the second detection part 10B has at least one of the second area S2 different from the first area S1 of the second detection element 12E, the second connection part length LC2 different from the first connection part length LC1 of the second connection part 32C, the second connection part width w2 different from first connection part width w1 of the second connection part 32C, the second connection part thickness t2 different from the first connection part thickness t1 of second connection part 32C, the second connection part material different from the first connection part material of the second connection part 32C, or the second distance d2 different from the first distance d1. The second distance d2 is a distance between the second base region 41b and the second detection element 12E.

The sensor 140a can also detect the concentration of the detection target substance with higher accuracy. A sensor capable of improving characteristics can be provided.

Figure 25:
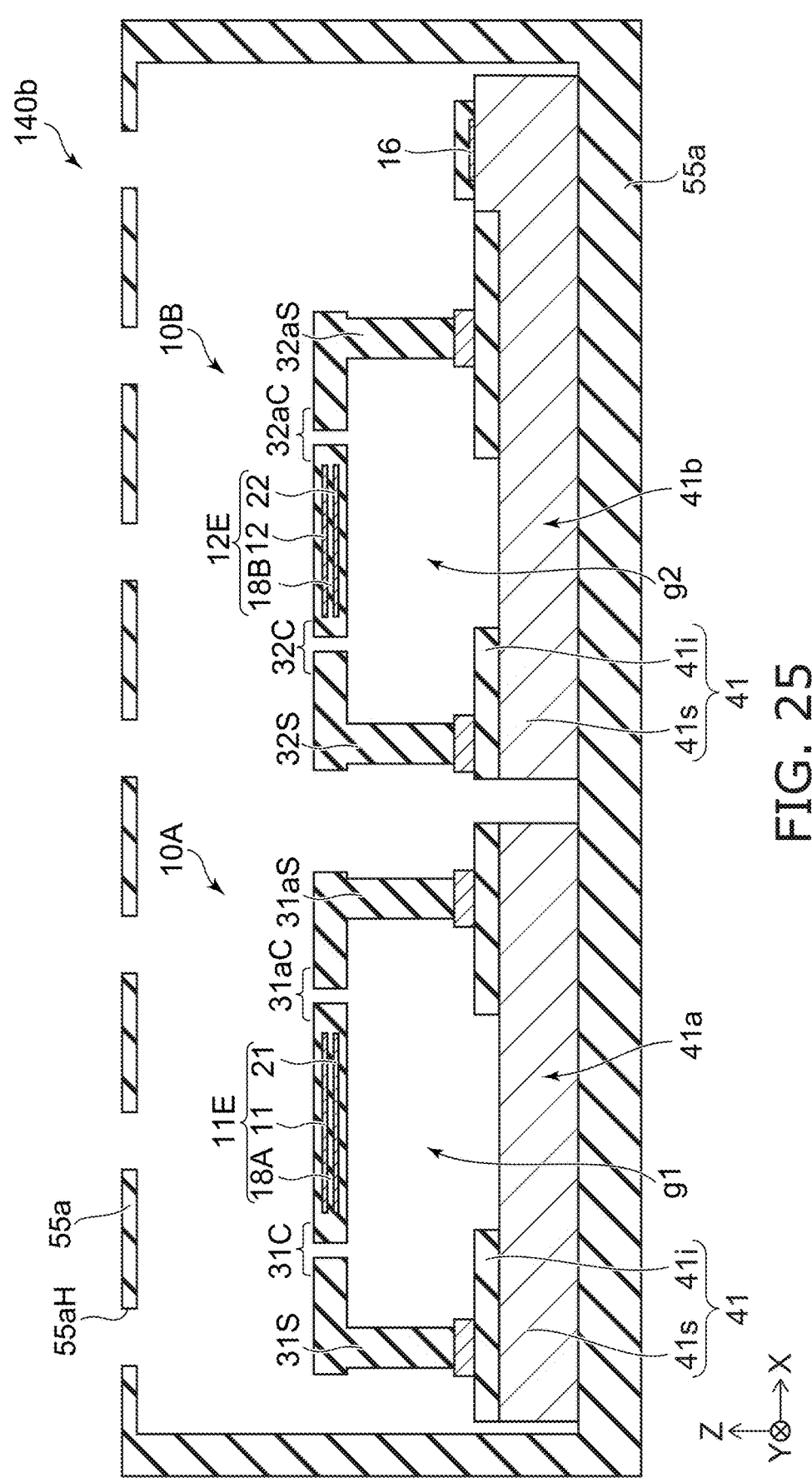
FIG. 25 is a schematic cross-sectional view illustrating a part of a sensor system according to the first embodiment.

FIG. 25 is a schematic cross-sectional view illustrating a part of the sensor system according to the first embodiment.

As shown in FIG. 25, a sensor 140b according to the embodiment includes the first housing 55a. The first housing 55a is, for example, a package. Other configurations of the sensor 140b may be the same as those of the sensor 140a. As shown in FIG. 25, in the sensor 140b, the first detection part 10A and the second detection part 10B are provided between multiple portions of the first housing 55a. The multiple portions are, for example, the bottom of the first housing 55a and the lid of the first housing 55a. As shown in FIG. 25, the hole 55aH is provided in a portion (for example, a lid) of the first housing 55a. Multiple holes 55aH may be provided. The hole 55aH serves as an entrance or an exit for the detection target substance (such as gas).

Figure 26A:
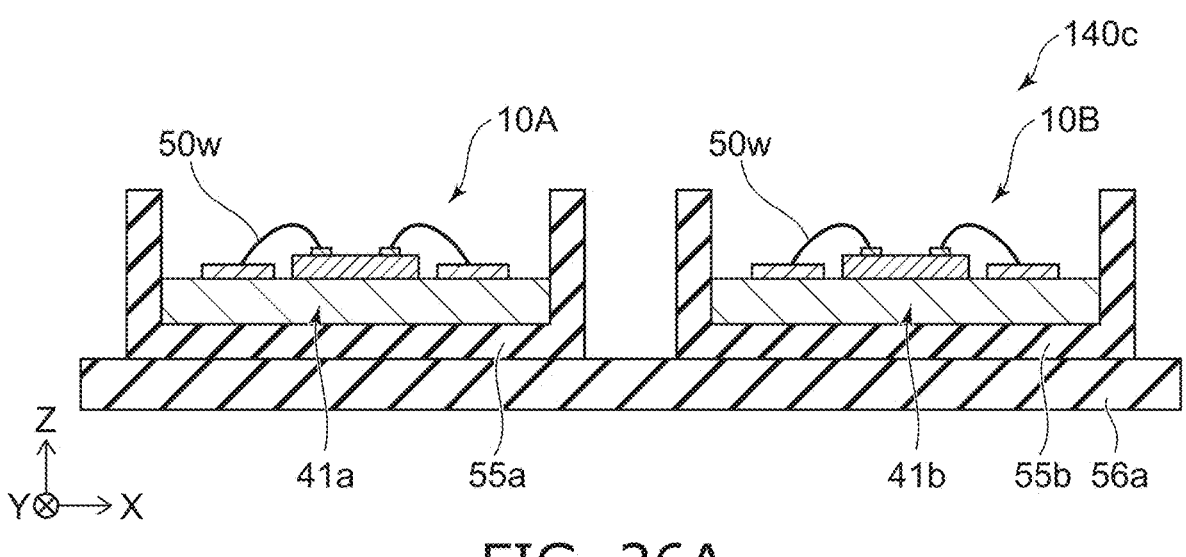
FIGS. 26A and 26B are schematic cross-sectional views each illustrating a part of a sensor system according to the first embodiment.
Figure 26B:
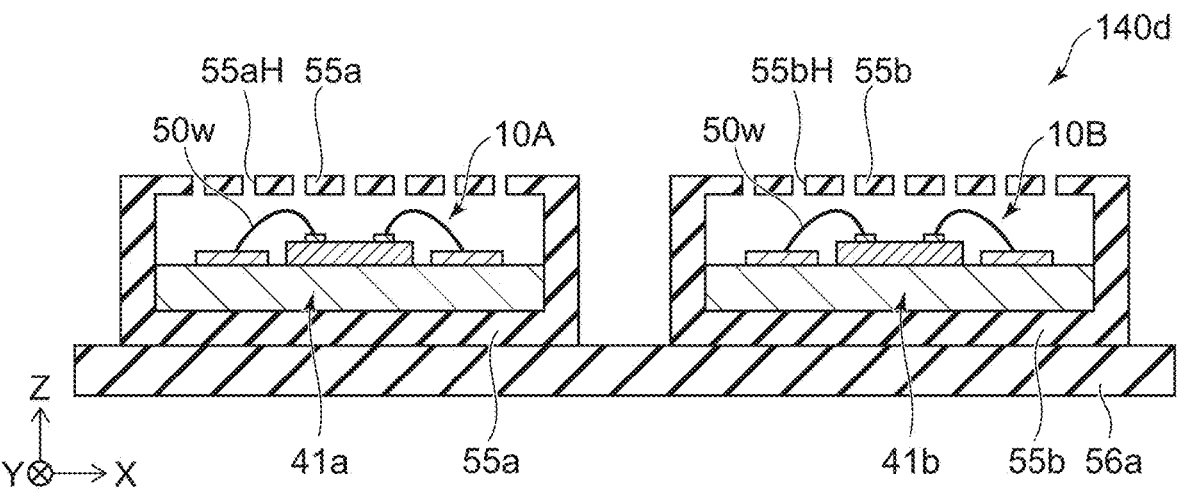

FIGS. 26A and 26B are schematic cross-sectional views each illustrating a part of a sensor system according to the first embodiment.

In a sensor 140c according to the embodiment shown in FIG. 26A, the first housing 55a and a second housing 55b are provided. The first detection part 10A is fixed to the first housing 55a. The second detection part 10B is fixed to the second housing 55b. The first housing 55a and the second housing 55b are fixed to the first mounting member 56a.

In a sensor 140d according to the embodiment shown in FIG. 26B, the first detection part 10A is provided between multiple portions of the first housing 55a. The multiple portions are, for example, the bottom of the first housing 55a and the lid of the first housing 55a. As shown in FIG. 26B, the hole 55aH is provided in a portion (for example, a lid) of the first housing 55a. Multiple holes 55aH may be provided. The hole 55aH serves as an entrance or an exit for the detection target substance (such as gas).

As shown in FIG. 26B, in the sensor 140d, the second detection part 10B is provided between multiple portions of the second housing 55b. The multiple portions are, for example, the bottom of the second housing 55b and the lid of the second housing 55b. As shown in FIG. 26B, a hole 55bH is provided in a portion (for example, a lid) of the second housing 55b. Multiple holes 55bH may be provided. The multiple holes 55bH serve as an entrance or an exit for the detection target substance (such as gas).

Figure 27A:
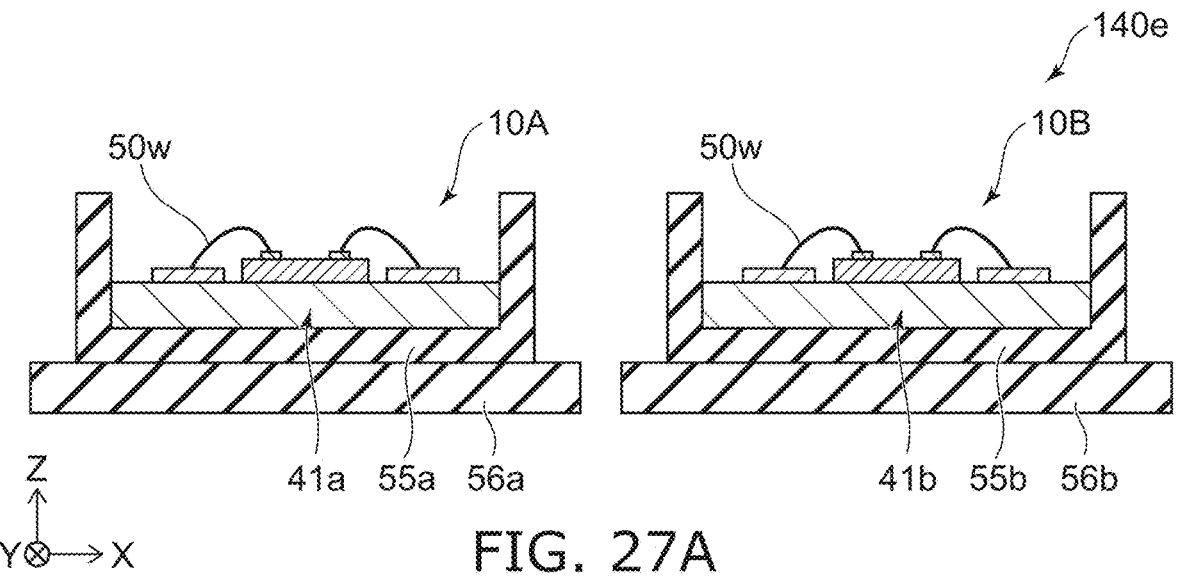
FIGS. 27A and 27B are schematic cross-sectional views each illustrating a part of a sensor system according to the first embodiment.
Figure 27B:
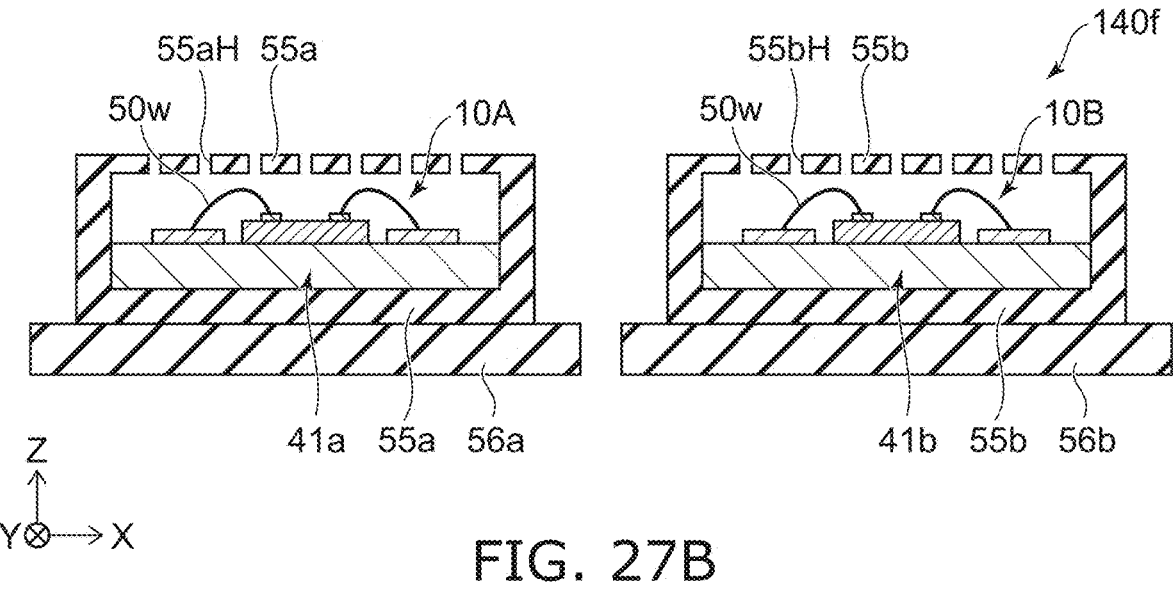

FIGS. 27A and 27B are schematic cross-sectional views each illustrating a part of a sensor system according to the first embodiment.

In a sensor 140e according to the embodiment shown in FIG. 27A, the first mounting member 56a and a second mounting member 56b are provided. The first detection part 10A is fixed to the first housing 55a. The second detection part 10B is fixed to the second housing 55b. The first housing 55a is fixed to the first mounting member 56a. The second housing 55b is fixed to the second mounting member 56b.

In a sensor 140f according to the embodiment shown in FIG. 27B, the first detection part 10A is provided between multiple portions of the first housing 55a. The multiple portions are, for example, the bottom of the first housing 55a and the lid of the first housing 55a. As shown in FIG. 27B, the hole 55aH may be provided in a portion (for example, a lid) of the first housing 55a. Multiple holes 55aH may be provided.

As shown in FIG. 27B, in a sensor 140f, the second detection part 10B is provided between multiple portions of the second housing 55b. The multiple portions are, for example, the bottom of the second housing 55b and the lid of the second housing 55b. As shown in FIG. 27B, the hole 55bH may be provided in a portion (for example, a lid) of the second housing 55b. Multiple holes 55bH may be provided.

Figure 28A:
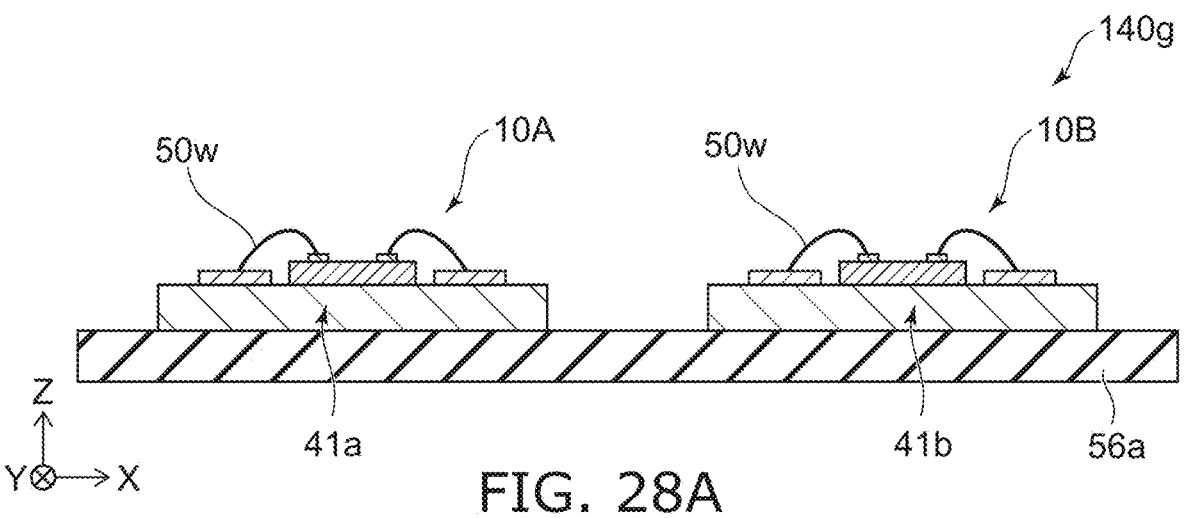
FIGS. 28A and 28B are schematic cross-sectional views each illustrating a part of a sensor system according to the first embodiment.
Figure 28B:
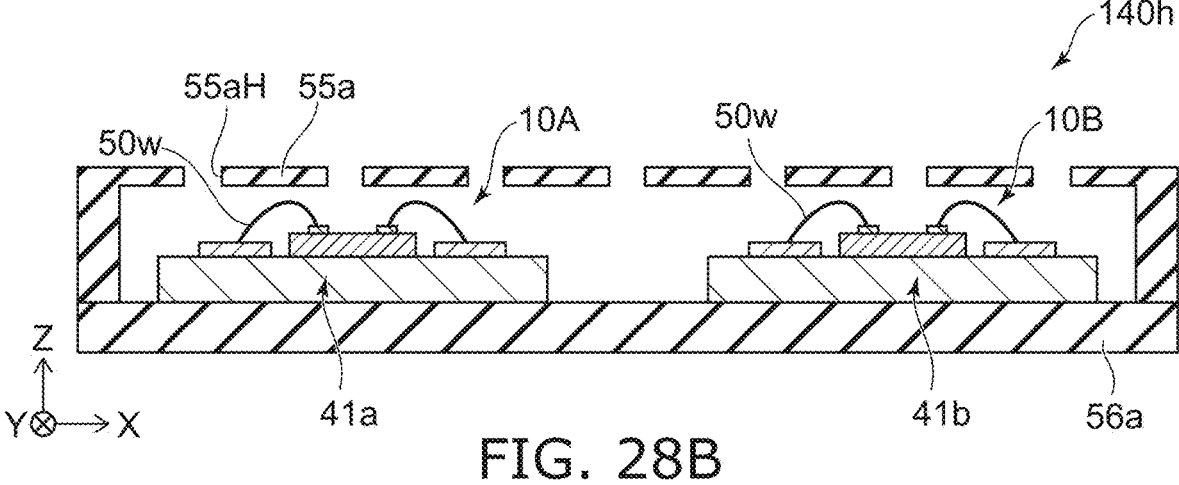

FIGS. 28A and 28B are schematic cross-sectional views each illustrating a part of a sensor system according to the first embodiment.

In a sensor 140g according to the embodiment shown in FIG. 28A, the first base region 41a and the second base region 41b are fixed to the first mounting member 56a.

In a sensor 140h according to the embodiment shown in FIG. 28B, the first detection part 10A and the second detection part 10B are provided between the first mounting member 56a and the first housing 55a.

Figure 29A:
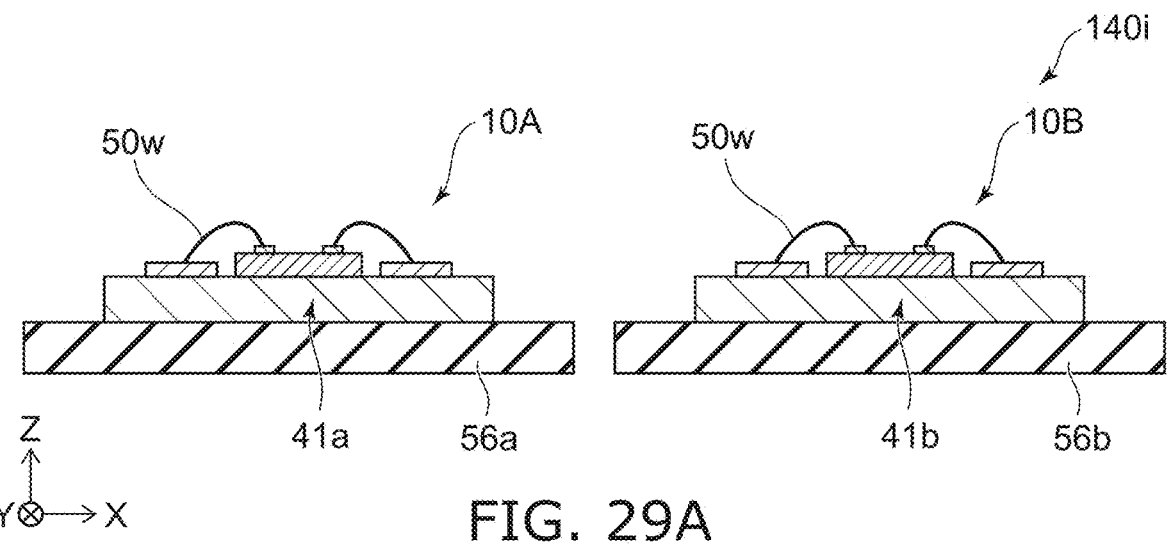
FIGS. 29A and 29B are schematic cross-sectional views each illustrating a part of a sensor system according to the first embodiment.
Figure 29B:
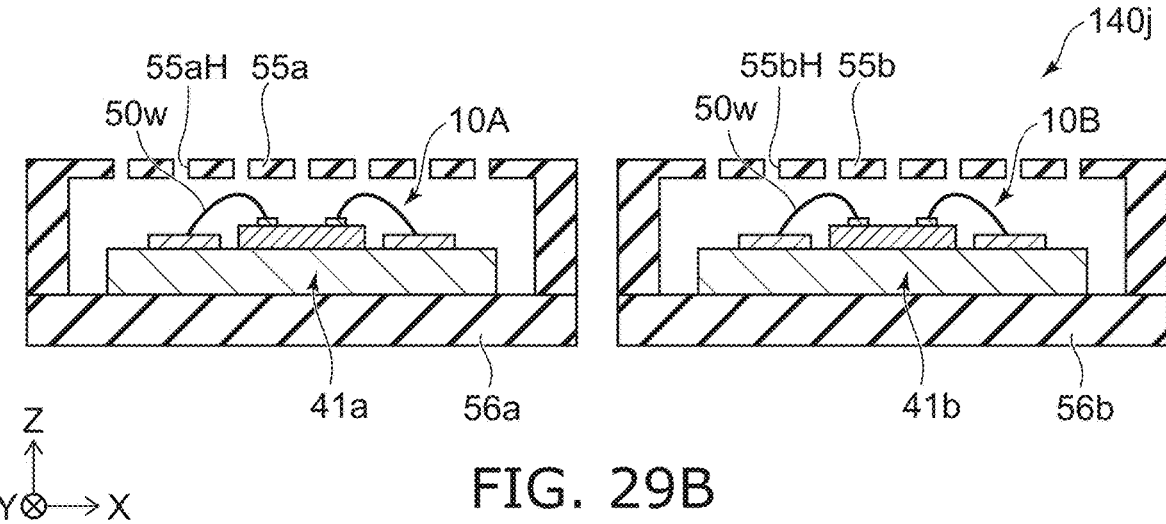

FIGS. 29A and 29B are schematic cross-sectional views each illustrating a part of a sensor system according to the first embodiment.

In a sensor 140i according to the embodiment shown in FIG. 29A, the first base region 41a is fixed to the first mounting member 56a. The second base region 41b is fixed to the second mounting member 56b.

In a sensor 140j according to the embodiment shown in FIG. 29B, the first detection part 10A is provided between the first mounting member 56a and the first housing 55a. The second detection part 10B is provided between the second mounting member 56b and the second housing 55b.

In the sensors 140a to 140j described above, for the configuration of the first support part 31S, the first connection part 31C, the first detection element 11E, the second support part 32S, the second connection part 32C, and the second detection element 12E, the configurations described with respect to the sensors 110, 111, 120-122, 130-132 and 135a-135e are applicable.

Three or more detection parts may be provided in the sensors 135a-135e and the sensors 140a-140j described above. The three or more detection parts may include, for example, the first detection part 10A, the second detection part 10B and the third detection part 10C or the like.

Second Embodiment

Figure 30A:
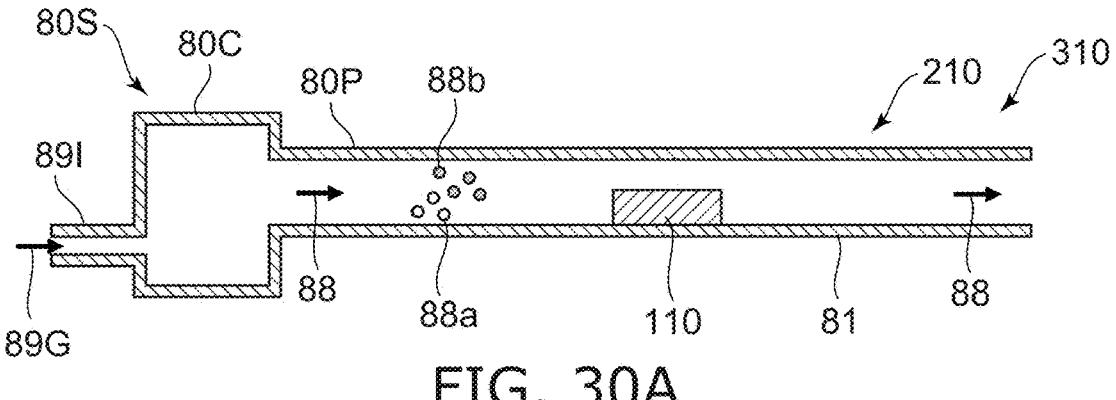
FIGS. 30A to 30C are schematic views illustrating various gas systems according to a second embodiment.
Figure 30B:
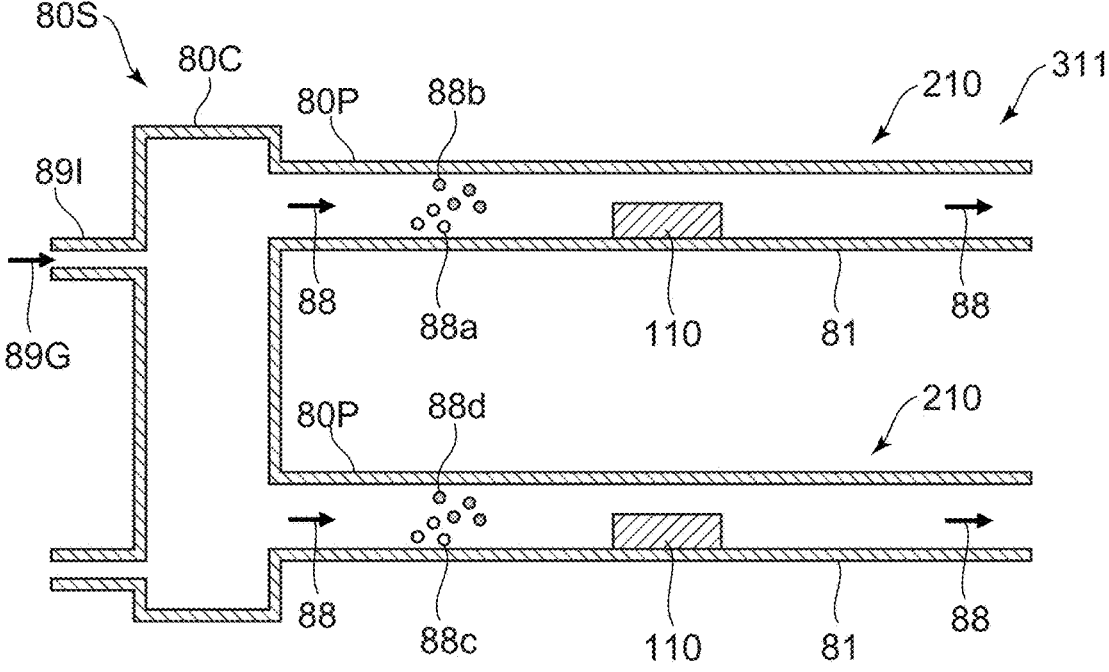
Figure 30C:
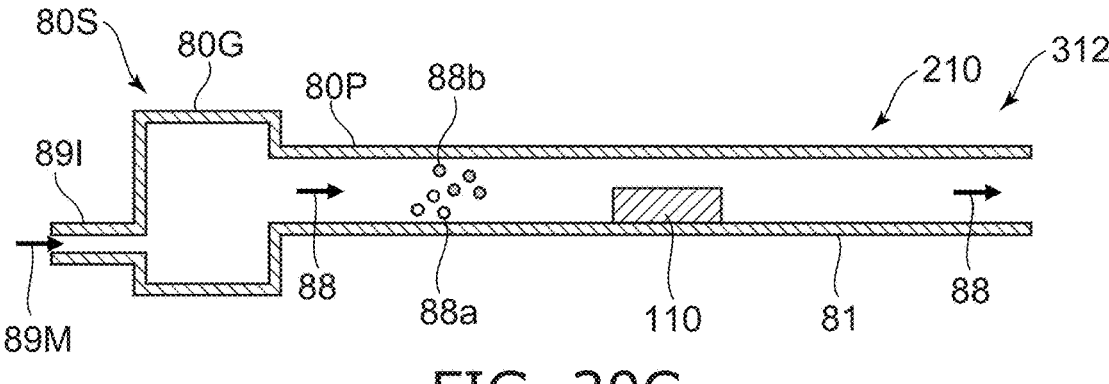

FIGS. 30A to 30C are schematic views illustrating various gas systems according to a second embodiment.

As shown in FIG. 30A, a gas system 310 according to the embodiment includes any sensor system 210 according to the first embodiment and a gas supplier 80S. A case where the sensor system 210 includes the sensor 110 will be described below. The gas supplier 80S can supply gas including the detection target substance 88 to the pipe 80P.

In the gas system 310, the gas supplier 80S includes an input part 891. A supply gas 89G is supplied to the input part 891. The gas supplier 80S can convert at least a part of the supply gas 89G supplied to the gas supplier 80S into at least a part of the gas including the detection target substance 88. In this example, the gas supplier 80S is a gas converter 80C.

For example, carbon dioxide is supplied to the gas converter 80C. For example, the following chemical reactions occur in the gas converter 80C.

$$CO_2 + 4H_2 \rightarrow CH_4 + 2H_2O$$

This chemical reaction yields a gas including the detection target substance 88. In this case, the gas including the detection target substance 88 includes methane and water. For example, the gas including the detection target substance 88 may include carbon dioxide. For example, the gas including the detection target substance 88 may include hydrogen. Thus, in one example, the gas including the detection target substance 88 includes at least one selected from the group consisting of methane, water, carbon dioxide and hydrogen.

For example, the following chemical reactions or electrochemical reactions may occur in the gas converter 80C.

$$CO_2 + H_2O \rightarrow CO + H_2 + O_2$$

For example, a gas including the detection target substance 88 is obtained. Carbon monoxide, hydrogen and oxygen are obtained from the gas including the detection target substance 88. The gas including the detection target substance 88 may include carbon dioxide. The gas including the detection target substance 88 may include hydrogen.

In the embodiment, the detection target substance 88 includes a first substance 88a and a second substance 88b different from the first substance 88a. For example, the first substance 88a includes one selected from the group consisting of carbon monoxide, carbon dioxide and hydrogen. The second substance 88*b* includes another one selected from the group consisting of carbon monoxide, carbon dioxide and hydrogen.

The gas supplier 80S can, for example, convert at least a part of the raw material supplied to the gas supplier 80S into at least a part of the gas including the detection target substance 88. Heat or electric power can be supplied from the outside to the gas converter 80C. A catalyst may be placed in the gas converter 80C to allow the conversion reaction to occur.

As shown in FIG. 30B, in a gas system 311 according to the embodiment, the sensor system 210 includes multiple pipes 80P and multiple sensors 110. One of the multiple sensors 110 can detect one detection target substance 88 of the multiple pipes 80P. Another one of the multiple sensors 110 can detect another one detection target substance 88 of the multiple pipes 80P.

In this example, one of the multiple sensors 110 is provided in one of the multiple pipes 80P. Another one of the multiple sensors 110 is provided in another one of the multiple pipes 80P.

In the gas system 311, one detection target substance 88 of the multiple pipes 80P includes the first substance 88*a* and the second substance 88*b* different from the first substance 88*a*. In one example, the first substance 88*a* includes one selected from the group consisting of carbon monoxide, carbon dioxide and hydrogen. The second substance 88*b* includes another one selected from the group consisting of carbon monoxide, carbon dioxide and hydrogen.

Another detection target substance 88 of the multiple pipes 80P includes a third substance 88*c* and a fourth substance 88*d* different from the third substance 88*c*. In one example, the third substance 88*c* includes one selected from the group consisting of oxygen and carbon dioxide. The fourth substance 88*d* includes another one selected from the group consisting of oxygen and carbon dioxide.

As shown in FIG. 30C, a gas system 312 according to the embodiment includes any sensor system 210 according to the first embodiment and the gas supplier 80S. The gas supplier 80S can generate gas including the detection target substance 88 from a raw material 89M. The gas supplier 80S is a gas generator 80G. The gas system 312 is, for example, a gas manufacturing system. The raw material 89M may include gases, liquids, or solids.

Embodiments may include the following configurations (for example, technical proposals).

Configuration 1

A sensor system, comprising:
a pipe; and
at least one sensor configured to detect a detection target substance in the pipe,
the sensor including
a base,
a first detection part, and
a second detection part,
the base including a first base region and a second base region,
the first detection part including a first support part, a first connection part, and a first detection element,
a position of the first detection part with respect to the first base region being fixed,
the first connection part being supported by the first support part,
the first connection part supporting the first detection element, a first gap being provided between the first base region and the first detection element,
the first detection part having a first area of the first detection element, a first connection part length of the first connection part, a first connection part width of the first connection part, a first connection part thickness of the first connection part, a first connection part material of the first connection part, and a first distance, the first distance being a distance between the first base region and the first detection element,
the second detection part including a second support part, a second connection part, and a second detection element,
a position of the second support part with respect to the second base region being fixed,
the second connection part being supported by the second support part,
the second connection part supporting the second detection element,
a second gap being provided between the second base region and the second detection element,
the second detection part having at least one of a second area different from the first area of the second detection element, a second connection part length different from the first connection part length of the second connection part, a second connection part width different from the first connection part width of the second connection part, a second connection part thickness different from the first connection part thickness of the first connection part thickness, a second connection part material different from the first connection part material of the second connection part, or a second distance different from the first distance, the second distance being a distance between the second base region and the second detection element.

Configuration 2
The sensor system according to Configuration 1, wherein the second base region is continuous with the first base region.

Configuration 3
The sensor system according to Configuration 1, wherein the second base region is separate from the first base region.

Configuration 4
The sensor system according to any one of Configurations 1 to 3, wherein
the detection target substance includes a first substance and a second substance different from the first substance.

Configuration 5
The sensor system according to Configuration 4, wherein
the first substance includes one selected from a group consisting of carbon monoxide, carbon dioxide, and hydrogen, and
the second substance includes another one selected from the group consisting of carbon monoxide, carbon dioxide, and hydrogen.

Configuration 6
The sensor system according to Configuration 4 or 5, wherein
The detection target substance is a gas.

Configuration 7
The sensor system according to any one of Configurations 1 to 6, wherein
the sensor includes a housing, at least a part of the first detection part and at least a part of the second detection part are provided between the base region and the housing, the housing includes a first inflow port and a first outflow port, the target detection substance is configured to flow in from the first inflow port between a part of the first housing and the first detection part and between a part of the first housing and the second detection part, and the target detection substance is configured to exit through the first outflow port.

Configuration 8

The sensor system according to any one of Configurations 1 to 7, wherein the pipe includes a first flow path and a second flow path branched off from the first flow path, and the sensor is provided in one of the first flow path and the second flow path.

Configuration 9

The sensor system according to any one of Configurations 1 to 7, wherein the pipe includes a first flow path including a first portion and a second portion, and a second flow path branched off from the first portion and connected to the second portion, and the sensor is provided in one of the first flow path and the second flow path.

Configuration 10

The sensor system according to any one of Configurations 1 to 7, wherein a plurality of the sensors are provided, and at least one of the sensors is provided in the pipe.

Configuration 11

The sensor system according to any one of Configurations 1 to 7, wherein a plurality of the sensors are provided, the pipe includes a first flow path and a second flow path branched off from the first flow path, and at least two of the sensors are provided in the second flow path.

Configuration 12

The sensor system according to any one of Configurations 1 to 7, wherein a plurality of the sensors are provided, the pipe includes a first flow path including a first portion, a second portion, a third portion, and a fourth portion, a second flow path branched off from the first portion and connected to the second portion, and a third flow path branched off from the third portion and connected to the fourth portion, at least one of the sensors is provided in the second flow path, and another one of the sensors is provided in the third flow path.

Configuration 13

The sensor system according to Configuration 4 or 5, wherein the first detection element includes a first resistance member, a first conductive member, and a first insulating member, at least a part of the first insulating member being between the first resistance member and the first conductive member, and the second detection element includes a second resistance member, a second conductive member, and a second insulating member, at least a part of the second insulating member being between the second resistance member and the second conductive member.

Configuration 14

The sensor system according to Configuration 13, wherein the sensor further includes a controller, the controller is configured to be electrically connected to the first resistance member, the first conductive member, the second resistance member, and the second conductive member, the controller is configured to perform a first operation, the controller supplies a first current to the first conductive member to raise a temperature of the first detection element in the first operation, the controller supplies a second current to the second conductive member to raise a temperature of the second detection element in the first operation, the controller derives a first value corresponding to a first electrical resistance of the first resistance member in the first operation, the controller derives a second value corresponding to a second electrical resistance of the second resistance member in the first operation, and the controller is configured to output a detection signal including a first detection value and a second detection value based on the first value and the second value in the first operation, the first detection value corresponding to a concentration of the first substance included in a space around the first detection element and the second detection element, the second detection value corresponding to a concentration of the second substance included in the space.

Configuration 15

The sensor system according to any one of Configurations 1 to 3, wherein a plurality of the pipes and a plurality of the sensors are provided, one of the plurality of sensors is configured to detect the detection target substance in one of the plurality of pipes, and another one of the plurality of sensors is configured to detect the detection target substance in another one of the plurality of pipes.

Configuration 16

The sensor system according to Configuration 15, wherein the detection target substance in one of the plurality of pipes includes a first substance, and a second substance different from the first substance, the first substance includes one selected from a group consisting of carbon monoxide, carbon dioxide, and hydrogen, the second substance includes an other one selected from the group consisting of carbon monoxide, carbon dioxide, and hydrogen, the detection target substance in the other one of the plurality of pipes includes a third substance, and a fourth substance different from the third substance, the third substance includes one selected from a group consisting of oxygen and carbon dioxide, and the fourth substance includes an other one selected from the group consisting of oxygen and carbon dioxide.

Configuration 17

A gas system, comprising:

the sensor system according to any one of Configurations 1 to 16; and a gas supplier configured to supply a gas including the detection target substance to the pipe.

Configuration 18
The gas system according to Configuration 17, wherein the gas supplier is configured to convert at least a part of a supply gas supplied to the gas supplier to at least a part of the gas including the detection target substance.

Configuration 19
The gas system according to Configuration 17, wherein the gas supplier is configured to convert at least a part of a raw material supplied to the gas supplier to at least a part of the gas including the detection target substance.

Configuration 20
The gas system according to Configuration 17, wherein the gas supplier is configured to generate the gas including the detection target substance from a raw material.

According to the embodiments, it is possible to provide a sensor system and a gas system with improved characteristics.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensor systems such as pipes, sensors, bases, detection parts, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensor systems, and gas systems practicable by an appropriate design modification by one skilled in the art based on the sensor systems, and the gas systems described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:
1. A sensor system, comprising:
a pipe; and
at least one sensor configured to detect a detection target substance in the pipe,
the at least one sensor including:
    a base,
    a first detection part, and
    a second detection part,
the base including a first base region and a second base region, the first detection part including a first support part, a first connection part, and a first detection element,
a position of the first detection part with respect to the first base region being fixed,
the first connection part being supported by the first support part,
the first connection part supporting the first detection element,
a first gap being provided between the first base region and the first detection element,
the first detection part having a first area of the first detection element, a first connection part length of the first connection part, a first connection part width of the first connection part, a first connection part thickness of the first connection part, a first connection part material of the first connection part, and a first distance, the first distance being a distance between the first base region and the first detection element,
the second detection part including a second support part, a second connection part, and a second detection element,
a position of the second support part with respect to the second base region being fixed,
the second connection part being supported by the second support part,
the second connection part supporting the second detection element,
a second gap being provided between the second base region and the second detection element, and
the second detection part having at least one of a second area different from the first area of the second detection element, a second connection part length different from the first connection part length of the second connection part, a second connection part width different from the first connection part width of the second connection part, a second connection part thickness different from the first connection part thickness of the first connection part thickness, a second connection part material different from the first connection part material of the second connection part, or a second distance different from the first distance, the second distance being a distance between the second base region and the second detection element.

2. The system according to claim 1, wherein the second base region is continuous with the first base region.

3. The system according to claim 1, wherein the second base region is separate from the first base region.

4. The system according to claim 1, wherein the detection target substance includes a first substance and a second substance different from the first substance.

5. The system according to claim 4, wherein the first substance includes one selected from a group consisting of carbon monoxide, carbon dioxide, and hydrogen, and the second substance includes another one selected from the group consisting of carbon monoxide, carbon dioxide, and hydrogen.

6. The system according to claim 4, wherein The detection target substance is a gas.

7. The system according to claim 4, wherein the first detection element includes a first resistance member, a first conductive member, and a first insulating member, at least a part of the first insulating member being between the first resistance member and the first conductive member, and the second detection element includes a second resistance member, a second conductive member, and a second insulating member, at least a part of the second insulating member being between the second resistance member and the second conductive member.

8. The system according to claim 7, wherein the at least one sensor further includes a controller, the controller is configured to be electrically connected to the first resistance member, the first conductive member, the second resistance member, and the second conductive member, the controller is configured to perform a first operation, the controller supplies a first current to the first conductive member to raise a temperature of the first detection element in the first operation, the controller supplies a second current to the second conductive member to raise a temperature of the second detection element in the first operation, the controller derives a first value corresponding to a first electrical resistance of the first resistance member in the first operation, the controller derives a second value corresponding to a second electrical resistance of the second resistance member in the first operation, and the controller is configured to output a detection signal including a first detection value and a second detection value based on the first value and the second value in the first operation, the first detection value corresponding to a concentration of the first substance included in a space around the first detection element and the second detection element, the second detection value corresponding to a concentration of the second substance included in the space.

9. The system according to claim 1, wherein the at least one sensor includes a housing, at least a part of the first detection part and at least a part of the second detection part are provided between the base and the housing, the housing includes a first inflow port and a first outflow port, the target detection substance is configured to flow in from the first inflow port between a part of the housing and the first detection part and between a part of the housing and the second detection part, and the detection target substance is configured to exit through the first outflow port.

10. The system according to claim 1, wherein the pipe includes a first flow path and a second flow path branched off from the first flow path, and the at least one sensor is provided in one of the first flow path and the second flow path.

11. The system according to claim 1, wherein the pipe includes:

a first flow path including a first portion and a second portion, and a second flow path branched off from the first portion and connected to the second portion, and the at least one sensor is provided in one of the first flow path and the second flow path.

12. The system according to claim 1, wherein the at least one sensor further includes a plurality of sensors, and at least one of the plurality of sensors is provided in the pipe.

13. The system according to claim 1, wherein the at least one sensor further includes a plurality of sensors, the pipe includes a first flow path and a second flow path branched off from the first flow path, and at least two of the plurality of sensors are provided in the second flow path.

14. The system according to claim 1, wherein the at least one sensor further includes a plurality of sensors, the pipe includes:

a first flow path including a first portion, a second portion, a third portion, and a fourth portion, a second flow path branched off from the first portion and connected to the second portion, and a third flow path branched off from the third portion and connected to the fourth portion, at least one of the plurality of sensors is provided in the second flow path, and another one of the plurality of sensors is provided in the third flow path.

15. The system according to claim 1, wherein the pipe further includes a plurality of pipes, the at least one sensor further includes a plurality of sensors, one of the plurality of sensors is configured to detect the detection target substance in one of the plurality of pipes, and another one of the plurality of sensors is configured to detect the detection target substance in another one of the plurality of pipes.

16. The system according to claim 15, wherein the detection target substance in one of the plurality of pipes includes a first substance, and a second substance different from the first substance, the first substance includes one selected from a group consisting of carbon monoxide, carbon dioxide, and hydrogen, the second substance includes an other one selected from the group consisting of carbon monoxide, carbon dioxide, and hydrogen, the detection target substance in the other one of the plurality of pipes includes a third substance, and a fourth substance different from the third substance, the third substance includes one selected from a group consisting of oxygen and carbon dioxide, and the fourth substance includes an other one selected from the group consisting of oxygen and carbon dioxide.

17. A gas system, comprising:

the sensor system according to claim 1; and a gas supplier configured to supply a gas including the detection target substance to the pipe.

18. The gas system according to claim 17, wherein the gas supplier is configured to convert at least a part of a supply gas supplied to the gas supplier to at least a part of the gas including the detection target substance.

19. The gas system according to claim 17, wherein the gas supplier is configured to convert at least a part of a raw material supplied to the gas supplier to at least a part of the gas including the detection target substance.

20. The gas system according to claim 17, wherein the gas supplier is configured to generate the gas including the detection target substance from a raw material.

* * * * *